United States Patent
Wang et al.

(10) Patent No.: US 11,335,113 B2
(45) Date of Patent: May 17, 2022

(54) TEXTURE IMAGE ACQUISITION CIRCUIT, DISPLAY PANEL AND TEXTURE IMAGE ACQUISITION METHOD

(71) Applicants: BEIJING BOE DISPLAY TECHNOLOGY CO., LTD., Beijing (CN); BOE TECHNOLOGY GROUP CO., LTD., Beijing (CN)

(72) Inventors: Jiabin Wang, Beijing (CN); Xiaoliang Ding, Beijing (CN); Xueyou Cao, Beijing (CN); Wenjuan Wang, Beijing (CN); Jing Liu, Beijing (CN); Yichi Zhang, Beijing (CN); Haisheng Wang, Beijing (CN); Lei Wang, Beijing (CN); Yingming Liu, Beijing (CN); Yingzi Wang, Beijing (CN)

(73) Assignees: BEIJING BOE DISPLAY TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 189 days.

(21) Appl. No.: 16/767,867

(22) PCT Filed: Jun. 14, 2019

(86) PCT No.: PCT/CN2019/091318
§ 371 (c)(1),
(2) Date: May 28, 2020

(87) PCT Pub. No.: WO2020/248238
PCT Pub. Date: Dec. 17, 2020

(65) Prior Publication Data
US 2021/0406499 A1 Dec. 30, 2021

(51) Int. Cl.
*G06V 40/13* (2022.01)
*G06F 3/041* (2006.01)
*G06V 40/12* (2022.01)

(52) U.S. Cl.
CPC ........ *G06V 40/1306* (2022.01); *G06F 3/0412* (2013.01); *G06V 40/1365* (2022.01)

(58) Field of Classification Search
None
See application file for complete search history.

(56) References Cited

FOREIGN PATENT DOCUMENTS

CN 102954753 A * 3/2013

OTHER PUBLICATIONS

English machine translation of Chinese patent publication CN102954753A. (Year: 2013).*

* cited by examiner

*Primary Examiner* — Nicholas J Lee
(74) *Attorney, Agent, or Firm* — Leason Ellis LLP

(57) ABSTRACT

A texture image acquisition circuit, a display panel and a texture image acquisition method. The texture image acquisition circuit includes a charge neutralization circuit and a first acquisition circuit, the charge neutralization circuit is electrically connected to the first acquisition circuit, the charge neutralization circuit receives a first control signal to cause a current flowing through the first acquisition circuit to be a first current, and the charge neutralization circuit is configured to receive a second control signal to cause a current flowing through the first acquisition circuit to be a second current, a direction of the second current and a direction of the first current are opposite to each other; the first acquisition circuit is configured to receive light from a texture and accumulate a first signal amount that is acquired after the light from the texture is converted, so as to acquire a first acquisition value.

20 Claims, 14 Drawing Sheets

US 11,335,113 B2

TEXTURE IMAGE ACQUISITION CIRCUIT, DISPLAY PANEL AND TEXTURE IMAGE ACQUISITION METHOD

CROSS-REFERENCE TO RELATED PATENT APPLICATIONS

The present application is a U.S. National Phase Application under 35 U.S.C. § 371 of International Patent Application No. PCT/CN2019/091318, filed Jun. 14, 2019, the present disclosure of which is incorporated herein by reference in its entirety as part of the present disclosure.

TECHNICAL FIELD

Embodiments of the present disclosure relate to a texture image acquisition circuit, a display panel and a texture image acquisition method.

BACKGROUND

With the growing popularity of mobile terminals, more and more users use mobile terminals for authentication, electronic payment and other operations. Because of the uniqueness of a skin texture such as a fingerprint pattern or a palmprint pattern, fingerprint recognition technology combined with optical imaging is gradually adopted by mobile electronic devices for authentication, electronic payment, etc. How to improve the accuracy of texture recognition is a focus in the art.

SUMMARY

At least one embodiment of the present disclosure provides a texture image acquisition circuit, including a charge neutralization circuit and a first acquisition circuit, the charge neutralization circuit is electrically connected to the first acquisition circuit, the charge neutralization circuit is configured to receive a first control signal to cause a current flowing through the first acquisition circuit to be a first current, and the charge neutralization circuit is configured to receive a second control signal to cause a current flowing through the first acquisition circuit to be a second current, a direction of the second current and a direction of the first current being opposite to each other; the first acquisition circuit is configured to receive light from a texture and accumulate a first signal amount that is acquired through converting the light from the texture, so as to acquire a first acquisition value.

For example, in the texture image acquisition circuit provided by an embodiment of the present disclosure, the first acquisition circuit includes a first photosensitive component, a first switch circuit and a first integral calculation circuit; a second electrode of the first photosensitive component is connected to the first switch circuit, and the first switch circuit is further connected to the first integral calculation circuit; the first photosensitive component is configured to receive the light from the texture and accumulate the first signal amount that is acquired through converting the light from the texture; the first integral calculation circuit is configured to receive the first signal amount and perform integral calculation on the first signal amount, so as to acquire the first acquisition value.

For example, in the texture image acquisition circuit provided by an embodiment of the present disclosure, a first electrode of the first photosensitive component is configured to be connected to the charge neutralization circuit; the charge neutralization circuit is configured to provide a first voltage to the first electrode of the first photosensitive component when receiving the first control signal, and is configured to provide a second voltage to the first electrode of the first photosensitive component when receiving the second control signal.

For example, in the texture image acquisition circuit provided by an embodiment of the present disclosure, the first voltage is larger than the second voltage.

For example, in the texture image acquisition circuit provided by an embodiment of the present disclosure, the charge neutralization circuit includes a first control transistor and a second control transistor, a gate electrode of the first control transistor is configured to receive the first control signal, a first electrode of the first control transistor is configured to receive the first voltage, and a second electrode of the first control transistor is connected to the first electrode of the first photosensitive component; a gate electrode of the second control transistor is configured to receive the second control signal, a first electrode of the second control transistor is connected to the first electrode of the first photosensitive component, and a second electrode of the second control transistor is configured to receive the second voltage; the first switch circuit includes a first switch transistor, the first integral calculation circuit includes a first calculation amplifier and a first capacitor, a gate electrode of the first switch transistor is configured to receive a first scanning signal, a first electrode of the first switch transistor is connected to the second electrode of the first photosensitive component, and a second electrode of the first switch transistor is connected to an inverting input terminal of the first calculation amplifier; a non-inverting input terminal of the first calculation amplifier is configured to receive a reference voltage, and an output terminal of the first calculation amplifier is configured to output the first acquisition value; a first electrode of the first capacitor is connected to the inverting input terminal of the first calculation amplifier, and a second electrode of the first capacitor is connected to the output terminal of the first calculation amplifier.

For example, in the texture image acquisition circuit provided by an embodiment of the present disclosure, a first electrode of the first photosensitive component is configured to receive a second voltage, and the second electrode of the first photosensitive component is further electrically connected to the charge neutralization circuit; the charge neutralization circuit is configured to provide a third voltage to the second electrode of the first photosensitive component when receiving the first control signal.

For example, in the texture image acquisition circuit provided by an embodiment of the present disclosure, the third voltage is less than the second voltage.

For example, in the texture image acquisition circuit provided by an embodiment of the present disclosure, the charge neutralization circuit includes a third control transistor, a gate electrode of the third control transistor is configured to receive the first control signal, a first electrode of the third control transistor is configured to receive the third voltage, a second electrode of the third control transistor is connected to the second electrode of the first photosensitive component; the first switch circuit includes a first switch transistor, the first integral calculation circuit includes a first calculation amplifier and a first capacitor, a gate electrode of the first switch transistor is configured to receive a first scanning signal, a first electrode of the first switch transistor is connected to the second electrode of the first photosensitive component, and a second electrode of the first switch transistor is connected to an inverting input terminal of the first calculation amplifier; a non-inverting input terminal of the first calculation amplifier is configured to receive a reference voltage, and an output terminal of the first calculation amplifier is configured to output the first acquisition value; a first electrode of the first capacitor is connected to the inverting input terminal of the first calculation amplifier, and a second electrode of the first capacitor is connected to the output terminal of the first calculation amplifier.

For example, in the texture image acquisition circuit provided by an embodiment of the present disclosure, a first electrode of the first photosensitive component is configured to receive a second voltage, and the first integral calculation circuit is further electrically connected to the charge neutralization circuit, the charge neutralization circuit is configured to provide a third voltage to the first integral calculation circuit when receiving the first control signal, and is configured to provide a reference voltage to the first integral calculation circuit when receiving the second control signal.

For example, in the texture image acquisition circuit provided by an embodiment of the present disclosure, the third voltage is less than the second voltage, and the reference voltage is larger than the second voltage.

For example, in the texture image acquisition circuit provided by an embodiment of the present disclosure, the charge neutralization circuit includes a fourth control transistor and a fifth control transistor, the first switch circuit includes a first switch transistor, the first integral calculation circuit includes a first calculation amplifier and a first capacitor; a gate electrode of the fourth control transistor is configured to receive the first control signal, a first electrode of the fourth control transistor is configured to receive the third voltage, and a second electrode of the fourth control transistor is connected to a non-inverting input terminal of the first calculation amplifier; a gate electrode of the fifth control transistor is configured to receive the second control signal, a first electrode of the fifth control transistor is configured to receive the reference voltage, and a second electrode of the fifth control transistor is connected to the non-inverting input terminal of the first calculation amplifier; a gate electrode of the first switch transistor is configured to receive a first scanning signal, a first electrode of the first switch transistor is connected to the second electrode of the first photosensitive component, and a second electrode of the first switch transistor is connected to an inverting input terminal of the first calculation amplifier; an output terminal of the first calculation amplifier is configured to output the first acquisition value; a first electrode of the first capacitor is connected to the inverting input terminal of the first calculation amplifier, and a second electrode of the first capacitor is connected to the output terminal of the first calculation amplifier.

For example, the texture image acquisition circuit provided by an embodiment of the present disclosure further includes a reference acquisition circuit, the reference acquisition circuit is electrically connected to the charge neutralization circuit, is configured not to receive light from the texture, and is configured to acquire a first reference value based on the first current.

For example, in the texture image acquisition circuit provided by an embodiment of the present disclosure, the reference acquisition circuit includes a reference photosensitive component, a reference switch circuit and a reference integral calculation circuit; a second electrode of the reference photosensitive component is connected to the reference switch circuit, and the reference switch circuit is further connected to the reference integral calculation circuit; the reference photosensitive component is configured not to receive light from the texture, and to acquire a reference signal amount based on the first current; the reference integral calculation circuit is configured to receive the reference signal amount and perform integral calculation on the reference signal amount to acquire the first reference value.

For example, in the texture image acquisition circuit provided by an embodiment of the present disclosure, the reference photosensitive component and the first photosensitive component are of the same type of photosensitive component.

For example, in the texture image acquisition circuit provided by an embodiment of the present disclosure, the reference switch circuit includes a reference switch transistor, the reference integral calculation circuit includes a reference calculation amplifier and a reference capacitor, a gate electrode of the reference switch transistor is configured to receive a scanning signal, a first electrode of the reference switch transistor is connected to a second electrode of the reference photosensitive component, and a second electrode of the reference switch transistor is connected to an inverting input terminal of the reference calculation amplifier; an output terminal of the reference calculation amplifier is configured to output the first reference value; a first electrode of the reference capacitor is connected to the inverting input terminal of the reference calculation amplifier, and a second electrode of the reference capacitor is connected to the output terminal of the reference calculation amplifier.

For example, the texture image acquisition circuit provided by an embodiment of the present disclosure further includes a second acquisition circuit, the charge neutralization circuit is electrically connected to the second acquisition circuit, the charge neutralization circuit is configured to receive a first control signal to cause a current flowing through the second acquisition circuit to be the first current, and the charge neutralization circuit is configured to receive the second control signal to cause a current flowing through the second acquisition circuit to be a third current, a direction of the third current and the direction of the first current being opposite to each other; the second acquisition circuit is configured to receive the light from the texture and accumulate a second signal amount acquired through converting the light from the texture to acquire a second acquisition value.

At least one embodiment of the present disclosure further provides a display panel, including a display region, the display region including a texture recognition region, a plurality of pixel units arranged in an array are arranged in the display region, and the pixel units located in the texture recognition region include any one of the texture image acquisition circuits provided by the embodiments of the present disclosure.

For example, the display panel provided by an embodiment of the present disclosure further includes a processing circuit, wherein the processing circuit is electrically connected to the first acquisition circuit, and is configured to process the first acquisition value, so as to acquire an image of the texture.

For example, in the display panel provided by an embodiment of the present disclosure, the texture image acquisition circuit further includes a reference acquisition circuit, the reference acquisition circuit is connected to the charge neutralization circuit, and is configured not to receive the light from the texture and to acquire a first reference value based on the first current; the processing circuit is further electrically connected to the reference acquisition circuit, and is configured to perform a processing operation according to the first acquisition value and the first reference value to acquire an image of the texture.

At least one embodiment of the present disclosure further provides a texture image acquisition method for the texture image acquisition circuit, including: during a charge neutralization period, allowing the charge neutralization circuit to receive the first control signal to cause the current flowing through the first acquisition circuit to be the first current; during an acquisition period, allowing the charge neutralization circuit to receive the second control signal to cause the current flowing through the first acquisition circuit to be the second current, the direction of the second current and the direction of the first current being opposite to each other; and allowing the first acquisition circuit to receive the light from the texture and to accumulate a first signal amount that is acquired through converting the light from the texture to acquire a first acquisition value.

For example, in the texture image acquisition method provided by an embodiment of the present disclosure, the texture image acquisition circuit further includes a reference acquisition circuit, the reference acquisition circuit is connected to the charge neutralization circuit, and is configured not to receive the light from the texture and to acquire a first reference value based on the first current; the texture image acquisition method further includes: during the charge neutralization period, allowing the charge neutralization circuit to receive the first control signal to cause a current flowing through the reference acquisition circuit to be the first current; and during the acquisition period, processing the first acquisition value and the first reference value to acquire an image of the texture.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can acquire other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Similarly, similar words such as "a", "an" or "the" do not denote a limitation of quantity, but rather denote the presence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On", "under", "left", "right", etc. are only used to indicate the relative positional relationship, and when the absolute position of the object to be described is changed, the relative positional relationship may also change accordingly.

At present, the narrow border is gradually becoming a mainstream for the design and manufacture of a display device, especially for a portable display device such as a mobile phone. One means to realize the narrow border is to integrate photosensitive components (photosensitive circuits) with a fingerprint recognition function into a display device, which realizes a fingerprint recognition mode under the screen and increases an area of a display region of the display device, and thus increasing the screen proportion.

For example, a point light source, a line light source or a light source with a certain pattern, etc. can be used as a photosensitive light source of an image sensor for texture image acquisition and further for fingerprint recognition.

The principle of texture image acquisition is described in the following by taking the case that a point light source is taken as the photosensitive light source of the photosensitive component, but this does not limit the embodiments of the present disclosure.

Figure 1A:
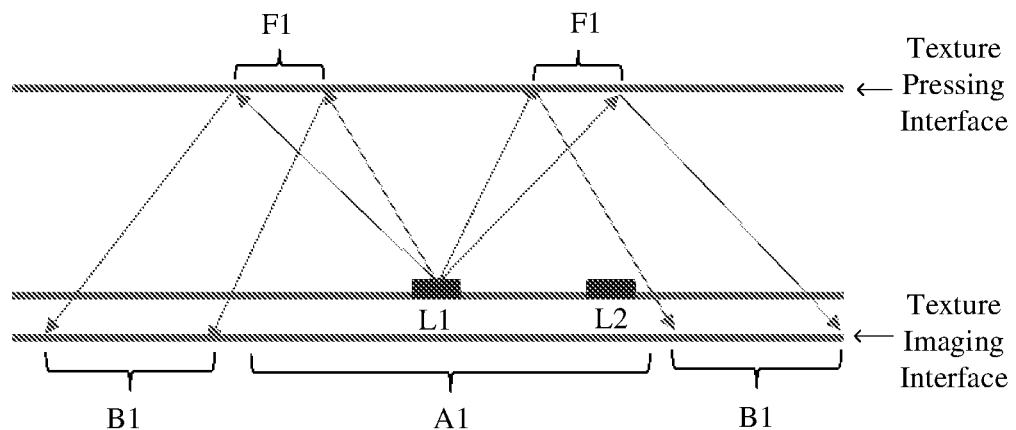
FIG. 1A is a schematic diagram of the principle of texture image acquisition.

In a reflective optical texture image acquisition device, in a texture image acquisition process, as illustrated in FIG. 1A, when a point light source L1 emits light, the light emitted by the point light source L1 irradiates a fingerprint pressing interface (e.g., an outer surface of a glass screen) at different angles, because of total reflection on the fingerprint pressing interface, a part of the light whose incident angle is larger than or equal to the critical angle θ of the total reflection undergoes total reflection, which results in that this part of the light is not able to exit from the fingerprint pressing interface, thus generating a total reflection region. Correspondingly, a part of the light whose incident angle is smaller than the critical angle θ of the total reflection exits from the fingerprint pressing interface. Therefore, a texture image can be collected by light reflected by the total reflection region, for example, a clear texture image is formed at a region B1 of the fingerprint imaging interface where the image sensor is located, the texture image corresponds to a part of the fingerprint at a region F1, the region F1 is the total reflection region, and the region B1 is an imaging region.

Specifically, for example, when a fingerprint of a user's finger presses the total reflection region F1, ridges of the fingerprint touch a surface of the total reflection region F1, so that the total reflection condition of positions corresponding to the ridges of the fingerprint is destroyed, and therefore light exits at the corresponding positions, so that an original reflection path is changed, while valleys of the fingerprint do not touch the surface of the total reflection region F1, so that the total reflection condition of positions corresponding to the valleys of the fingerprint is not destroyed, therefore light is still totally reflected at the corresponding positions, and thus the original reflection path is not changed. In this way, the light in the total reflection region causes light incident on the fingerprint imaging interface to form a texture image with alternate bright and dark at different positions because of the different influences of the valleys and the ridges of the fingerprint on the total reflection condition.

In addition, because the interference is caused by the light emitted from the fingerprint pressing interface and reflected by fingerprints or the like, or because the light emitted by the light source is reflected to the fingerprint imaging interface by other functional layers before reaching the fingerprint pressing interface, a region A1 of the fingerprint imaging interface becomes an invalid detection region, and this region cannot form an effective texture image. In the invalid region A1, a part of the light emitted by the light source L1 that is reflected to the fingerprint imaging interface by other functional layers before reaching the fingerprint pressing interface and a part of the light emitted by the light source L1 that is almost vertically reflected by the fingerprint pressing interface have higher brightness and are basically in a center of the invalid region A1, thus forming a highlight region. Because the highlight region has a higher brightness, a larger photoelectric signal is generated in a part of the image sensor array corresponding to the highlight region, which is easy to form a afterimage, thus the invalid region A1 is also known as a afterimage region.

Figure 1B:
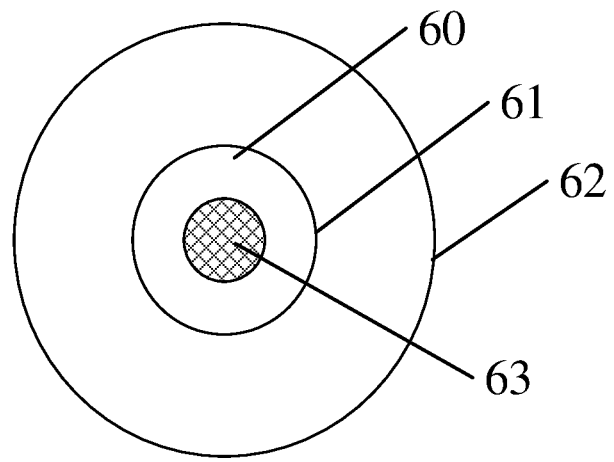
FIG. 1B is a schematic diagram of an imaging range of a point light source.

For example, FIG. 1B illustrates a schematic diagram of an imaging range of a point light source. As illustrated in FIG. 1B, in a photosensitive range of the point light source, an effective imaging range is in an annular shape, that is, in FIG. 1B, an annular region between an inner circle 61 and an outer circle 62 is the effective imaging range which corresponds to the imaging region B1 corresponding to the total reflection region F1 in FIG. 1A; a region within the inner circle 61 of the annular shape (hereinafter referred to as a ring center 60) is the invalid imaging region, corresponding to the invalid region A1 in FIG. 1A; a part of a region (the shaded region) 13 inside the ring center 60 is the highlight region (afterimage region), and it is easy to cause a afterimage by the highlight region in the image sensor array during imaging.

In the process of texture recognition, the effective imaging range formed by one light source is limited, so a plurality of side by side light sources (e.g., a plurality of light sources arranged in an array) can be simultaneously provided, and the effective imaging ranges of the light sources are combined to form a larger effective imaging range. However, as mentioned above, there is still an ineffective region for each light source, therefore in some cases, only one light source array may still fail to satisfy the requirements of texture recognition. As for this, for example, a method of lighting a plurality of light sources or a plurality of light source arrays in a time-sharing manner can be adopted to form a plurality of effective imaging ranges, and the effective imaging ranges of one light source array cover the ineffective regions of another light source array, so that the effective imaging ranges of the different light source arrays are superposed and spliced, and a larger texture image can be acquired. However, when the plurality of light sources (or light source arrays) are lit in the time-sharing manner to form a larger range of texture image, because the lighting interval time between two adjacent light sources is short, the influence of a highlight region formed by one light source on the corresponding part of the photosensitive component array does not disappear quickly, but partially remains in the corresponding part of the photosensitive component array. When the corresponding part of the photosensitive component array is located in the effective imaging region of other light sources lit later, the above-mentioned remained influence causes afterimages in the spliced texture images, thus causing an incomplete texture image formed by splicing the effective imaging ranges of the different light sources and further causing an unrecognizable texture image or inaccurate texture image recognition. On the other hand, if the lighting interval time of two adjacent light sources is prolonged, the time of texture image acquisition is prolonged and the user experience is affected.

It should be noted that, in the embodiments of the present disclosure, the interval time between two adjacent lighting of the light source array is referred to as one frame, and a texture image acquired by lighting the light source array once is referred to as one image frame. For example, in the above-mentioned texture image splicing method, the light source arrays corresponding to two adjacent frames are two different light source arrays adjacent to each other (e.g., the light sources respectively constituting the two arrays are offset from each other by a predetermined interval along a predetermined direction (e.g., transverse direction or longitudinal direction). Of course, in the process of acquiring the texture image, all light source arrays may be lit at the same time in each frame, and then the plurality of image frames acquired are processed to acquire the final texture image.

The above afterimage phenomenon is explained from another angle below. For example, photosensitive components usually adopt photosensitive materials to perform photoelectric conversion on the light received by the photosensitive components, so as to generate carrier charges, and then perform an analog-to-digital conversion on the charges, so as to acquire a signal amount corresponding to the texture. However, the inventor discovered through research that because of the material characteristics of photosensitive materials (such as amorphous silicon, gallium arsenide and other semiconductor materials), the charges generated after a photoelectric conversion may not be completely derived from the photosensitive component in a short time, which causes that, in the process of acquiring the texture image, the residual charges of the previous frame in the photosensitive component superpose with the charges of the current frame, thus causing the afterimage phenomenon, further causing the acquired texture image to be unclear, and finally affecting the effectiveness and accuracy of texture recognition.

Figure 2A:
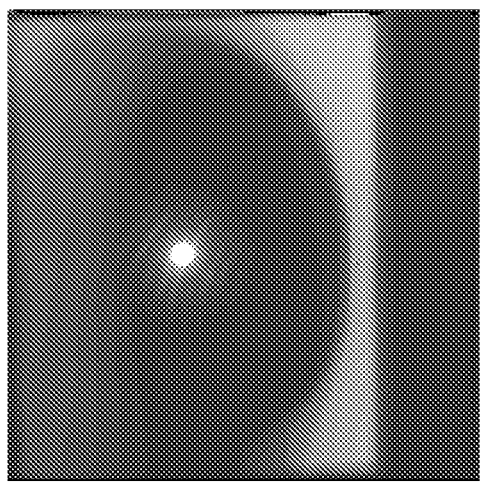
FIG. 2A is a schematic diagram of an afterimage in a texture image.
Figure 2B:
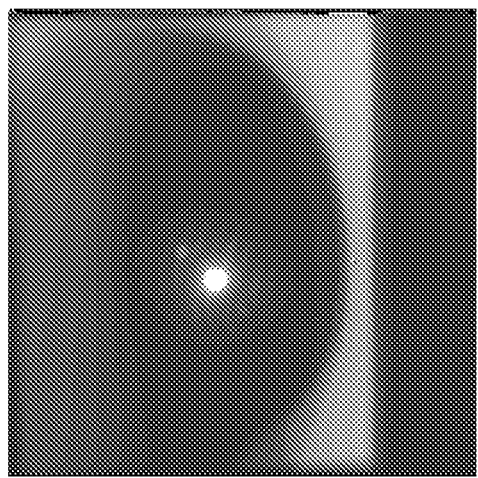
FIG. 2B is a schematic diagram of another afterimage in a texture image.

FIG. 2A and FIG. 2B respectively illustrate schematic diagrams of two afterimage phenomena. For example, FIG. 2A illustrates the afterimage caused by the bright spot of the previous frame; FIG. 2B illustrates the afterimage caused when bright spots appear continuously. In the texture images acquired in the two cases illustrated in FIG. 2A and FIG. 2B, the signal amount corresponding to the afterimage may be larger than the signal amount corresponding to the texture image, which may cause an unclear acquired texture image, and may affect subsequent image processing operations such as feature point extraction on the texture image in serious cases.

At least one embodiment of the present disclosure provides a texture image acquisition circuit, including a charge neutralization circuit and a first acquisition circuit. The charge neutralization circuit is electrically connected to the first acquisition circuit, the charge neutralization circuit is configured to receive a first control signal to cause a current flowing through the first acquisition circuit to be a first current, and the charge neutralization circuit is configured to receive a second control signal to cause a current flowing through the first acquisition circuit to be a second current, and the direction of the second current and the direction of the first current are opposite to each other; the first acquisition circuit is configured to receive light from a texture and accumulate a first signal amount that is acquired through converting the light from the texture, so as to acquire a first acquisition value. Embodiments of the present disclosure further provide a display panel and a texture image acquisition method that are corresponding to the above-mentioned texture image acquisition circuit.

In the texture image acquisition circuit, the display panel and the texture image acquisition method provided by the embodiments of the present disclosure, a reverse current (e.g., first current) can be utilized to partially or completely neutralize the residual charges of the previous frame, thereby improving or avoiding the afterimage phenomenon caused by the residual charges, and improving the effectiveness and accuracy of texture image acquisition.

Some embodiments of the present disclosure and examples thereof are described in detail below with reference to the accompanying drawings.

Figure 3:
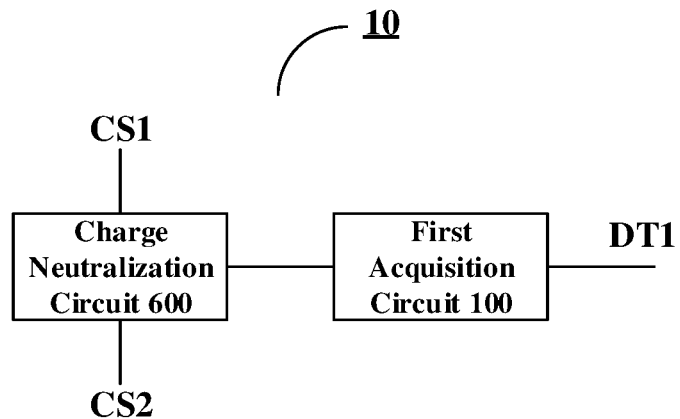
FIG. 3 is a schematic diagram of a texture image acquisition circuit provided by at least one embodiment of the present disclosure.

At least one embodiment of the present disclosure provides a texture image acquisition circuit 10, as illustrated in FIG. 3, the texture image acquisition circuit 10 includes a charge neutralization circuit 600 and a first acquisition circuit 100.

For example, as illustrated in FIG. 3, the charge neutralization circuit 600 is electrically connected to the first acquisition circuit 100. The charge neutralization circuit 600 is configured to receive a first control signal CS1 to cause a current flowing through the first acquisition circuit 100 to be a first current, and the charge neutralization circuit 600 is configured to receive a second control signal CS2 to cause a current flowing through the first acquisition circuit 100 to be a second current, the direction of the second current and the direction of the first current are opposite to each other.

For example, the first acquisition circuit 100 is configured to receive light from a texture (e.g., light reflected by the texture) and accumulate a first signal amount that is acquired through converting the light from the texture, so as to acquire a first acquisition value DT1.

For example, after the first acquisition circuit 100 completes the acquisition of the previous frame of the texture image of, there may be residual charges inside the first acquisition circuit 100, and then before the acquisition of the next frame, the charge neutralization circuit 600 is allowed to receive the first control signal CS1 to cause the current flowing through the first acquisition circuit 100 to be the first current, for example, the direction of the first current is from the charge neutralization circuit 600 to the first acquisition circuit 100. After the charge neutralization circuit 600 applies the first current to the first acquisition circuit 100, the residual charges in the first acquisition circuit 100 can be at least partially or completely neutralized, so that the residual charges in the first acquisition circuit 100 can be partially or completely eliminated before the acquisition of the next frame.

Then, the acquisition of the next frame is started, and at this time the charge neutralization circuit 600 is allowed to receive the second control signal CS2 so that a current flowing through the first acquisition circuit 100 is a second current, for example, the direction of the second current is from the first acquisition circuit 100 to the charge neutralization circuit 600. For example, the first acquisition circuit 100 can perform normal acquisition operations when being applied with the second current, for example, the first acquisition circuit 100 can receive the light from the texture, and perform a photoelectric conversion on the received light to generate electric charges, and then, for example, perform an analog-to-digital conversion on the electric charges to acquire the signal amount corresponding to the texture.

For example, in the embodiments of the present disclosure, the signal amount acquired after the first acquisition circuit 100 converts the light from the texture is referred to as the first signal amount. For example, the first acquisition circuit 100 can also accumulate the first signal amount to acquire the first acquisition value DT1. For example, the first acquisition value DT1 can be provided to a processing circuit for further data processing, so as to finally acquire an image of the texture.

The texture image acquisition circuit 10 provided by at least one embodiment of the present disclosure, for example, can partially or completely neutralize the residual charges in the first acquisition circuit 100 during the acquisition interval of two frames of texture images, thereby improving or avoiding the afterimage phenomenon caused by the residual charges, improving the effectiveness and accuracy of texture image acquisition, and finally improving the accuracy of texture recognition of a display panel or a display device that adopt the texture image acquisition circuit 10.

Figure 4:
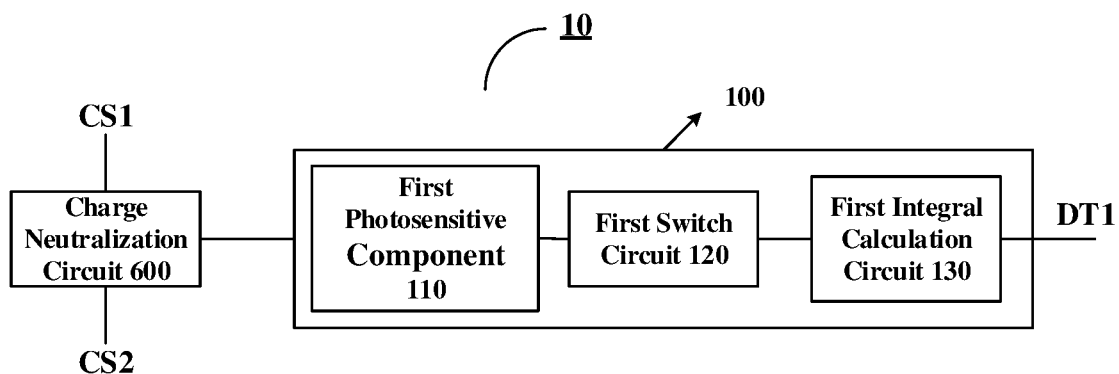
FIG. 4 is a schematic diagram of another texture image acquisition circuit provided by at least one embodiment of the present disclosure.

For example, in the texture image acquisition circuit 10 provided by some embodiments of the present disclosure, as illustrated in FIG. 4, the first acquisition circuit 100 includes a first photosensitive component 110, a first switch circuit 120, and a first integral calculation circuit 130.

As illustrated in FIG. 4, a second electrode (e.g., cathode) of the first photosensitive component 110 is connected to the first switch circuit 120, and the first switch circuit 120 is also connected to the first integral calculation circuit 130.

For example, the first photosensitive component 110 is configured to receive light from a texture (e.g., light reflected by the texture) and accumulate the first signal amount that is acquired through converting the light from the texture. The first integral calculation circuit 130 is configured to receive the first signal amount and perform integral calculation on the first signal amount, so as to acquire the first acquisition value DT1.

Figure 5:
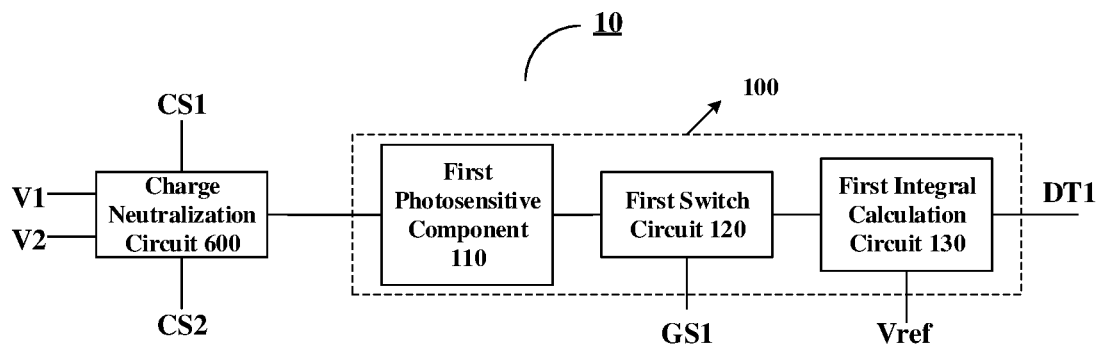
FIG. 5 is a schematic diagram of yet another texture image acquisition circuit provided by at least one embodiment of the present disclosure.

For example, in the texture image acquisition circuit 10 provided by some embodiments of the present disclosure, as illustrated in FIG. 5, the first electrode (e.g., anode) of the first photosensitive component 110 is configured to be connected to the charge neutralization circuit 600.

The charge neutralization circuit 600 is configured to provide a first voltage V1 to the first electrode of the first photosensitive component 110 when receiving the first control signal CS1, and is configured to provide a second voltage V2 to the first electrode of the first photosensitive component 110 when receiving the second control signal CS2. For example, the first voltage V1 is larger than the second voltage V2. For example, under the action of the first voltage V1 or the second voltage V2, at least a part of the circuits in the first acquisition circuit 100 are in different biased states, and the biased states include forward bias and reverse bias.

For example, the charge neutralization circuit 600 is configured to receive the first voltage V1 and the second voltage V2, the first switch circuit 120 is configured to receive a first scanning signal GS1, and the first integral calculation circuit 130 is configured to receive a reference voltage Vref.

For example, during an acquisition interval of two frames of texture images (e.g., a charge neutralization period P1 described below), the charge neutralization circuit 600 transmits the first voltage V1 to a first electrode of the first photosensitive component 110 under the control of the first control signal CS1. At the same time, the first switch circuit 120 is turned on under the control of the first scanning signal GS1. At this time, the voltages applied to the two electrodes of the first photosensitive component 110 are the first voltage V1 and the reference voltage Vref. For example, the reference voltage Vref is less than the first voltage V1, which causes the current flowing through the first photosensitive component 110 to be the first current, and the direction of the first current is from the first electrode of the first photosensitive component 110 to the second electrode of the first photosensitive component 110. The residual charges in the first photosensitive component 110 is partially or completely neutralized under the action of the first current.

Then, before starting the acquisition of the next frame, the charge neutralization circuit 600 transmits the second voltage V2 to the first electrode of the first photosensitive component 110 under the control of the second control signal CS2. For example, the second voltage V2 is less than the reference voltage Vref. At the same time, the first switch circuit 120 is kept in an on state under the control of the first scanning signal GS1, at this time, the voltages applied to the two electrodes of the first photosensitive component 110 are controlled to be the second voltage V2 and the reference voltage Vref, and the current flowing through the first photosensitive component 110 is the second current under the action of the second voltage V2 and the reference voltage Vref, and the direction of the second current and the direction of the first current are opposite to each other. For example, the first photosensitive component 110 is in a forward biased state when the first current is applied, and the first photosensitive component 110 is in a reverse biased state when the second current is applied. For example, the first photosensitive component 110 can perform normal acquisition operations when being in the reverse biased state, for example, can receive the light from the texture, can perform an photoelectric conversion on the received light to generate charges, and then, for example, can a perform analog-to-digital conversion on the charges, so as to acquire the signal amount corresponding to the texture.

Then, an acquisition period of the next frame (for example, acquisition period P2 described below) is started, at this time, the first switch circuit 120 is turned off under the control of the first scanning signal GS1, the first photosensitive component 110 receives the light from the texture, and accumulates the first signal amount that is acquired through converting the light from the texture. Then, the first switch circuit 120 is turned on under the control of the first scanning signal GS1, and the first integral calculation circuit 130 receives the first signal amount and performs integral calculation on the first signal amount to acquire the first acquisition value DT1.

The inventors of the present disclosure discovered through research that, when the above-mentioned texture image acquisition circuit 10 is in operation, for example, when the charge neutralization circuit 600 neutralizes the residual charges in the first photosensitive component 110 by the first current, the first current may generate residual charges in the first photosensitive component 110, thereby may introducing noise in the texture image acquisition circuit 10.

Therefore, in order to reduce the noise introduced by the first current mentioned above, as illustrated in FIG. 6, the texture image acquisition circuit 10 provided by some embodiments of the present disclosure further includes a reference acquisition circuit 400.

Figure 6:
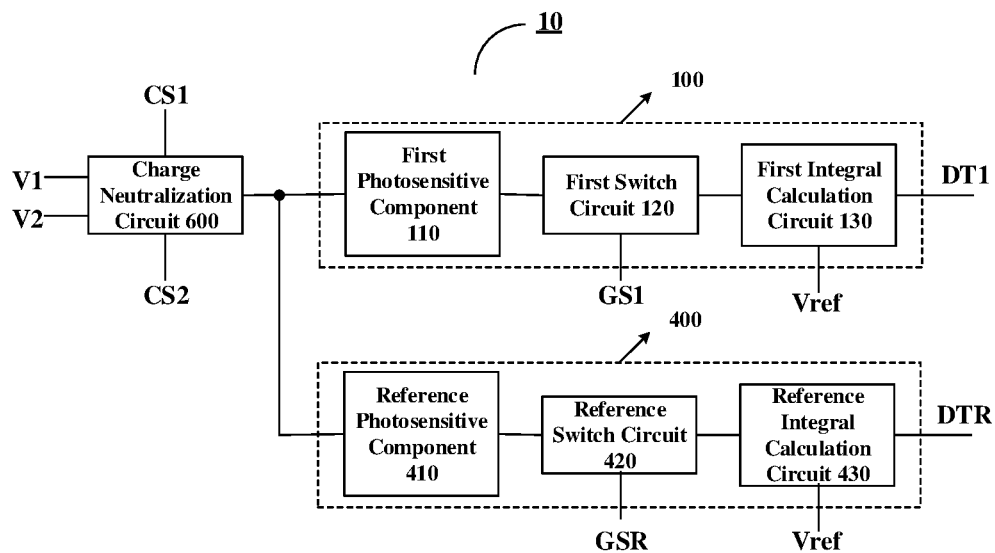
FIG. 6 is a schematic diagram of yet another texture image acquisition circuit provided by at least one embodiment of the present disclosure.

As illustrated in FIG. 6, the reference acquisition circuit 400 and the charge neutralization circuit 600 are electrically connected, and the reference acquisition circuit 400 is configured not to receive light from the texture, and acquire a first reference value DTR based on the first current.

For example, as illustrated in FIG. 6, in some embodiments, the reference acquisition circuit 400 includes a reference photosensitive component 410, a reference switch circuit 420, and a reference integral calculation circuit 430.

A second electrode (e.g., cathode) of the reference photosensitive component 410 is connected to the reference switch circuit 420, and the reference switch circuit 420 is also connected to the reference integral calculation circuit 430.

For example, the reference photosensitive component 410 is configured not to receive the light from the texture, and is configured to acquire a reference signal amount based on the first current, and the reference integral calculation circuit 430 is configured to receive the reference signal amount and perform integral calculation on the reference signal amount, so as to acquire the first reference value DTR.

For example, when the reference photosensitive component 410 is fabricated on an array substrate of a display panel, a light shielding structure may be provided on the array substrate to shield the reference photosensitive component 410. For example, the light shielding structure can be made of a material with a low light transmittance. The embodiments of the present disclosure do not limit the specific form and material of the light shielding structure as long as the reference photosensitive component 410 cannot receive light.

For example, in some embodiments, the reference photosensitive component 410 and the first photosensitive component 110 are of the same type of photosensitive component. For example, the reference photosensitive component 410 and the first photosensitive component 110 adopt photosensitive components with the same technical parameters, so that the above noise can be better reduced or avoided.

For example, when the charge neutralization circuit 600 applies the first current to the first photosensitive component 110, it also applies the first current to the reference photosensitive component 410. Because the reference photosensitive component 410 cannot receive light, there is no signal amount acquired by converting the received light by the photosensitive component 410. The reference photosensitive component 410 only acquires the reference signal amount based on the first current, and then the reference integral calculation circuit 430 can receive the reference signal amount and perform integral calculation on the reference signal amount to acquire the first reference value DTR. The first reference value DTR acquired by the reference acquisition circuit 400 is only related to the first current.

After the first acquisition circuit 100 and the reference acquisition circuit 400 respectively acquire the first acquisition value DT1 and the first reference value DTR, for example, the first acquisition value DT1 and the first reference value DTR are calculated (e.g., subtracted) to reduce or eliminate the influence of the noise caused by the first current.

Figure 7:
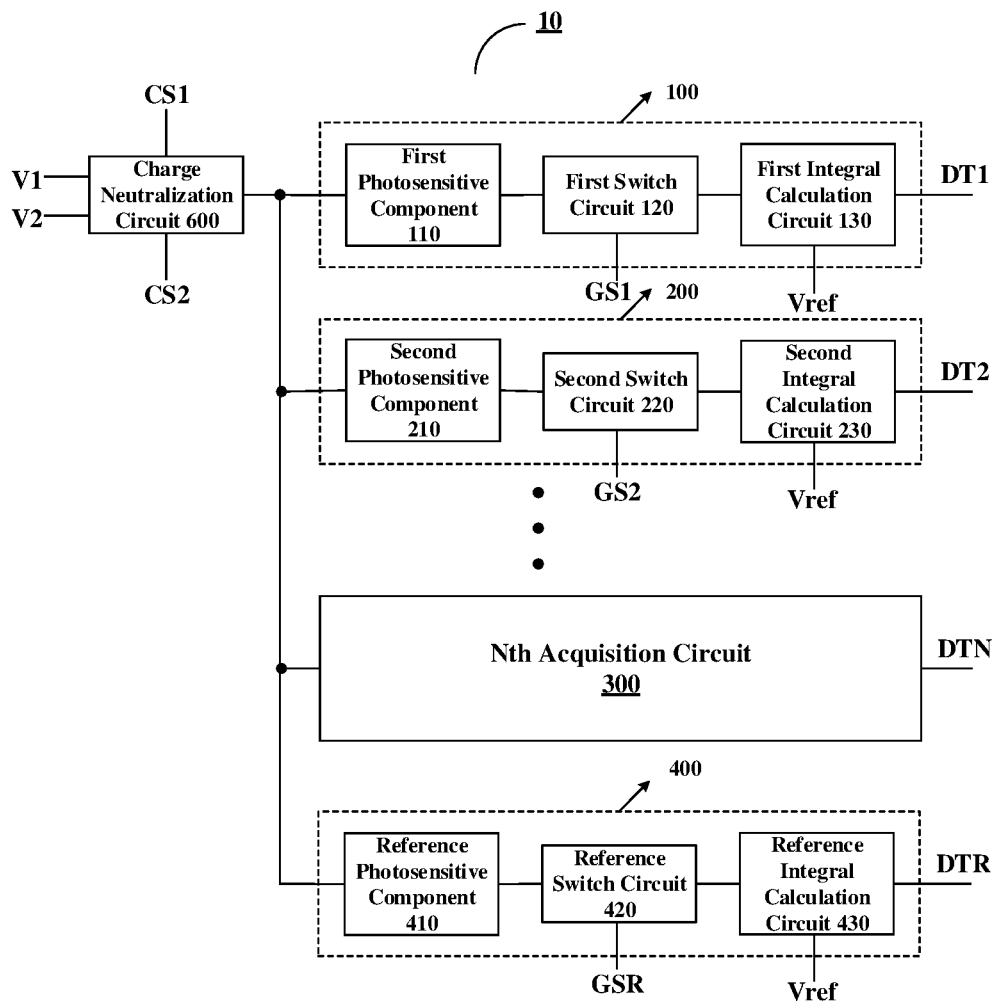
FIG. 7 is a schematic diagram of yet another texture image acquisition circuit provided by at least one embodiment of the present disclosure.

Based on the same technical idea as the above embodiments, as illustrated in FIG. 7, the texture image acquisition circuit 10 provided by some embodiments of the present disclosure may further include a second acquisition circuit 200.

For example, the second acquisition circuit 200 is electrically connected to the charge neutralization circuit 600, and the charge neutralization circuit 600 is configured to receive the first control signal CS1 to cause the current flowing through the second acquisition circuit 200 to be the first current, and is configured to receive the second control signal CS2 to cause the current flowing through the second acquisition circuit 200 to be a third current, and the direction of the third current and the direction of the first current are opposite to each other.

For example, the second acquisition circuit 200 is configured to receive light from the texture and accumulate a second signal amount that is acquired through converting the light from the texture, so as to acquire a second acquisition value DT2.

For example, similar to the first acquisition circuit 100, the second acquisition circuit 200 includes a second photosensitive component 210, a second switch circuit 220, and a second integral calculation circuit 230. The second switch circuit 220 is configured to receive the second scanning signal GS2, and the second integral calculation circuit 230 is configured to receive the reference voltage Vref.

As illustrated in FIG. 7, the texture image acquisition circuit 10 provided by some embodiments of the present disclosure may further include an Nth acquisition circuit 300, and DTN in FIG. 7 represents an Nth acquisition value acquired by the Nth acquisition circuit 300. The Nth acquisition circuit 300 may adopt a structure similar to the structure of the first acquisition circuit 100, which is not be described again herein. It should be noted that the number of acquisition circuits illustrated in FIG. 7 is only schematic, and no limitation is imposed to this in the embodiments of the present disclosure.

In addition, it should be note that in FIG. 7, the first acquisition circuit 100 includes the first integral calculation circuit 130, the second acquisition circuit 200 includes the second integral calculation circuit 230, and the reference acquisition circuit 400 includes the reference integral calculation circuit 430, i.e., each acquisition circuit includes a separate integral calculation circuit, and the embodiments of the present disclosure include but are not limited to this. Because the integral calculation circuits in the acquisition circuits have similar functions, it is also possible to make a plurality of acquisition circuits share the same integral calculation circuit, as long as appropriate driving timing is correspondingly adopted, thus simplifying the circuit structure design. This part of contents is described in detail below and is not repeated herein.

In the texture image acquisition circuit 10 provided by at least one embodiment of the present disclosure, by arranging a plurality of acquisition circuits, a larger range of texture image can be simultaneously acquired, thereby improving the efficiency of texture image acquisition, and finally shortening the time for texture recognition of a display panel or a display device that adopt the texture image acquisition circuit 10, thereby improving user experience.

The implementation of the texture image acquisition circuit 10 illustrated in FIG. 7 is described below with reference to FIG. 8.

Figure 8:
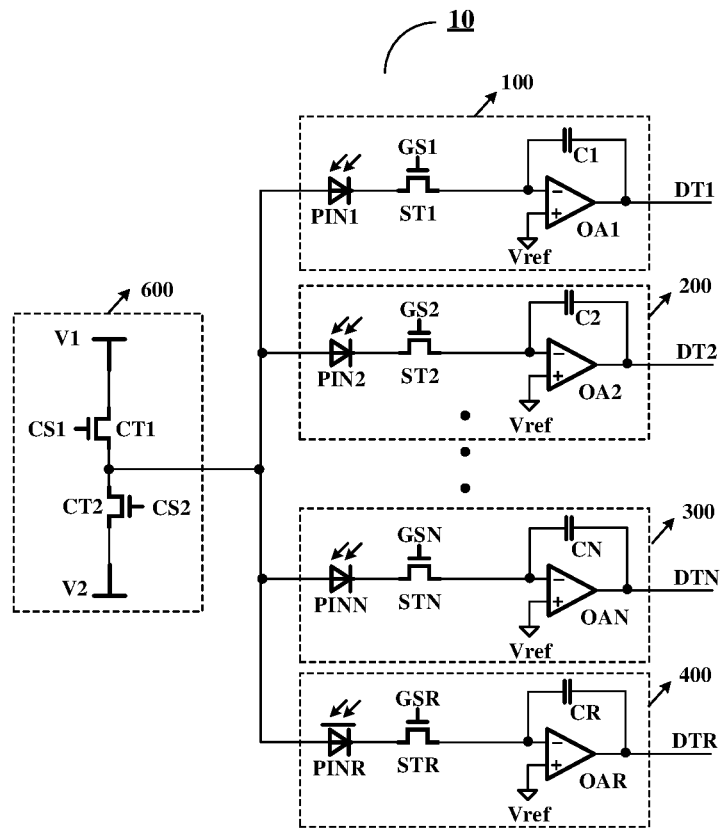
FIG. 8 is a circuit diagram of a texture image acquisition circuit provided by at least one embodiment of the present disclosure.

As illustrated in FIG. 8, in some embodiments, the charge neutralization circuit 600 may be implemented to include a first control transistor CT1 and a second control transistor CT2.

The gate electrode of the first control transistor CT1 is configured to receive the first control signal CS1, the first electrode of the first control transistor CT1 is configured to receive the first voltage V1, and the second electrode of the first control transistor CT1 is connected to the first electrode of the first photosensitive component PIN1.

The gate electrode of the second control transistor CT2 is configured to receive the second control signal CS2, the first electrode of the second control transistor CT2 is connected to the first electrode of the first photosensitive component PIN1, and the second electrode of the second control transistor CT2 is configured to receive the second voltage V2.

For example, in some embodiments, the first switch circuit 120 may be implemented as a first switch transistor ST1, and the first integral calculation circuit 130 may be implemented to include a first calculation amplifier OA1 and a first capacitor C1.

The gate electrode of the first switch transistor ST1 is configured to receive the first scanning signal GS1, the first electrode of the first switch transistor ST1 is connected to the second electrode of the first photosensitive component PIN1, and the second electrode of the first switch transistor ST1 is connected to an inverting input terminal of the first calculation amplifier OA1.

A non-inverting input terminal of the first calculation amplifier OA1 is configured to receive the reference voltage Vref, and an output terminal of the first calculation amplifier OA1 is configured to output the first acquisition value DT1. The first electrode of the first capacitor C1 is connected to an inverting input terminal of the first calculation amplifier OA1, and the second electrode of the first capacitor C1 is connected to the output terminal of the first calculation amplifier OA1.

For example, in some embodiments, the reference switch circuit 420 may be implemented as a reference switch transistor STR, and the reference integral calculation circuit 430 can be implemented to include a reference calculation amplifier OAR and a reference capacitor CR.

The gate electrode of the reference switch transistor STR is configured to receive the reference scanning signal GSR, the first electrode of the reference switch transistor STR is connected to a second electrode of the reference photosensitive component PINR, and a second electrode of the reference switch transistor STR is connected to an inverting input terminal of the reference calculation amplifier OAR. An output terminal of the reference calculation amplifier OAR is configured to output the first reference value DTR. The first electrode of the reference capacitor CR is connected to the inverting input terminal of the reference calculation amplifier OAR, and the second electrode of the reference capacitor CR is connected to the output terminal of the reference calculation amplifier OAR.

It should be noted that the implementations of the second acquisition circuit 200 and the Nth reference circuit 300 are similar to that of the first acquisition circuit 100. For example, the second acquisition circuit 200 may be implemented to include a second photosensitive component PIN2, a second switch transistor ST2, a second calculation amplifier OA2, and a second capacitor C2, and the second switch transistor ST2 is configured to receive a second scanning signal GS2, and the output terminal of the second calculation amplifier OA2 is configured to output a second acquisition value DT2; the Nth acquisition circuit 300 can be implemented to include an Nth photosensitive component PINN, an Nth switch transistor STN, an Nth calculation amplifier OAN, and an Nth capacitor CN, and the Nth switch transistor STN is configured to receive the Nth scanning signal GSN, and the output terminal of the Nth calculation amplifier OAN is configured to output the Nth acquisition value DTN. The connection relationship between the second acquisition circuit 200 and the Nth acquisition circuit 300 can be described with reference to the corresponding description of the first acquisition circuit 100, which is not repeated herein.

Figure 9:
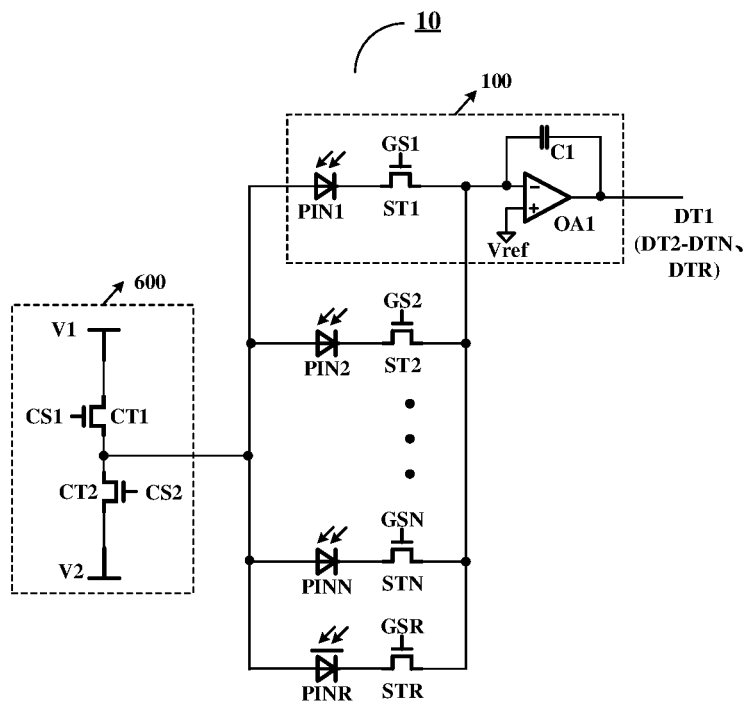
FIG. 9 is a circuit diagram of another texture image acquisition circuit provided by at least one embodiment of the present disclosure.

Some embodiments of the present disclosure further provide a texture image acquisition circuit 10. As illustrated in FIG. 9, the difference between this texture image acquisition circuit 10 and the texture image acquisition circuit 10 illustrated in FIG. 8 is that, all the acquisition circuits in the texture image acquisition circuit 10 illustrated in FIG. 9 share the same integral calculation circuit, i.e., share the same first calculation amplifier OA1 and the same first capacitor C1. In this case, it is required that the first switch transistor ST1, the second switch transistor ST2, ..., the Nth switch transistor STN, and the reference switch transistor STR to be respectively turned on at different periods of time, so that the first calculation amplifier OA1 can respectively output the first acquisition value DT1, the second acquisition value DT2, ..., the Nth acquisition value DTN, and the first reference value DTR at the different periods of time.

For example, the photosensitive component (e.g., the first photosensitive component 110, the second photosensitive component 210, etc.) in the texture image acquisition circuit 10 provided by the embodiment of the present disclosure can adopt a PIN type diode, and the embodiments of the present disclosure include but are not limited to this. For example, the photosensitive component can also adopt various appropriate types of photosensitive components such as other types of photosensitive diodes (e.g., PN type diodes or OPD type diodes). According to needs, the photosensitive component can sense, for example, only light with a certain wavelength (e.g., red light or green light) or all the visible light.

For example, in some embodiments of the present disclosure, the reference voltage Vref is 1 V, the first voltage V1 is 1.5 V or 1.8 V, and the second voltage V2 is −2 V; for another example, the reference voltage Vref is 1.25 V, the first voltage V1 is 2 V, and the second voltage V2 is −4 V. The embodiments of the present disclosure do not limit the specific values of the reference voltage Vref, the first voltage V1, and the second voltage V2.

It should be noted that the transistors used in the embodiments of the present disclosure may all be thin film transistors or field effect transistors or other switch devices with the same characteristics. The source electrode and drain electrode of the transistor used here may be symmetrical in structure, therefore the source electrode and drain electrode are structurally indistinguishable. In the embodiments of the present disclosure, in order to distinguish the two electrodes of the transistor except the gate electrode, one of the two electrodes is directly described as the first electrode, and the other of the two electrodes is described as the second electrode, therefore the first electrode and the second electrode of all or part of the transistors in the embodiments of the present disclosure are interchangeable as required. For example, the first electrode of the transistor described in the embodiments of the present disclosure is the source electrode and the second electrode is the drain electrode; alternatively, the first electrode of the transistor is the drain electrode and the second electrode is the source electrode.

In addition, transistors can be divided into n-type transistors and p-type transistors according to the characteristics thereof. In the case that the transistor is a p-type transistor, the on voltage is a low level voltage (e.g., 0 V, −5 V, −10 V or other suitable voltage), and the off voltage is a high level voltage (e.g., 5 V, 10 V or other suitable voltage); in the case that the transistor is an n-type transistor, the on voltage is a high level voltage (e.g., 5 V, 10 V or other suitable voltage), and the off voltage is a low level voltage (e.g., 0 V, −5 V, −10 V or other suitable voltage). The transistors in the embodiments of the present disclosure are described by taking an n-type transistor as an example. Based on the description and teaching of this implementation in the present disclosure, one of ordinary skill in the art can easily think that the embodiments of the present disclosure can also adopt p-type transistors without creative labor.

The operation principle of the texture image acquisition circuit 10 illustrated in FIG. 9 is described below with reference to the signal timing diagram illustrated in FIG. 11.

Figure 11:
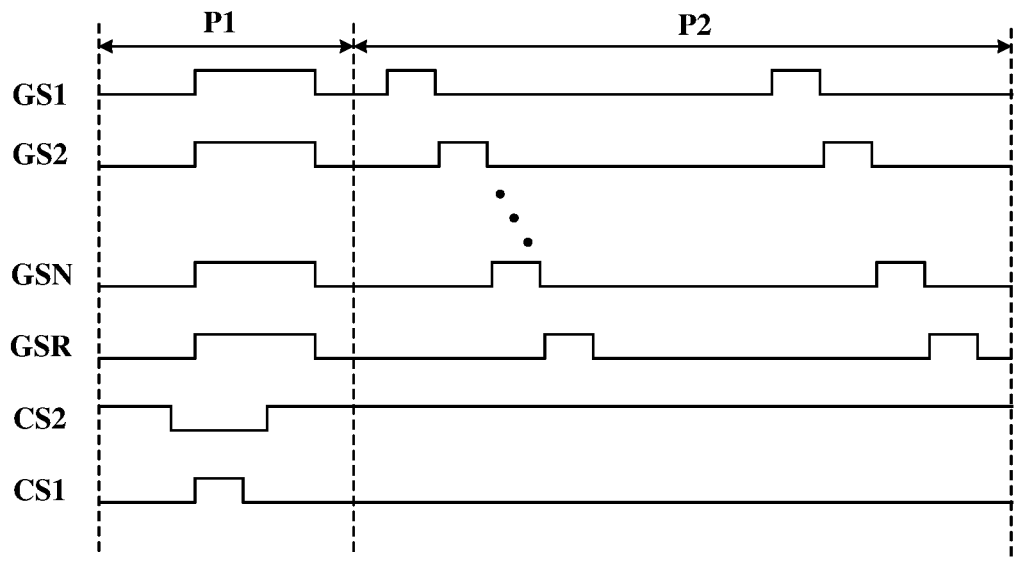
FIG. 11 is a signal timing diagram for the texture image acquisition circuit illustrated in FIG. 9 provided by at least one embodiment of the present disclosure.

As illustrated in FIG. 9 and FIG. 11, in the charge neutralization period P1, before the scanning signals (first scanning signal GS1, second scanning signal GS2, ..., Nth scanning signal GSN, reference scanning signal GSR) controlling each of switch transistors (first switch transistor ST1, second switch transistor ST2, ..., Nth scanning signal GSN, reference scanning signal GSR) become a high level, the second control signal CS2 controlling the second control transistor CT2 is controlled to be a low level, so that the second control transistor CT2 is turned off. Then, the scanning signals controlling each of the switch transistors are controlled to be a high level, so that these switch transistors are turned on, at the same time, the first control signal CS1 controlling the first control transistor CT1 is controlled to be a high level, so that the first control transistor CT1 is turned on, the first voltage V1 is supplied to the first electrode (e.g., anode) of each photosensitive component (the first photosensitive component PIN1, the second photosensitive component PIN2, ..., the Nth photosensitive component PINN, the reference photosensitive component PINR) through the turned-on first control transistor CT1, and at this time, each photosensitive component is in a forward biased state, thereby forming the first current flowing through each photosensitive component. Under the action of the first current, the residual charges in each photosensitive component (excluding the reference photosensitive component here) is partially or completely neutralized. At this time, the reference photosensitive component PINR can accumulate the first current to acquire a reference signal amount.

Then, the first control signal CS1 becomes a low level, thus the first control transistor CT1 is turned off. Then, the second control signal CS2 becomes a high level, thus the second control transistor CT2 is turned on. The second voltage V2 is provided to the first electrode of each photosensitive component through the turned-on second control transistor CT2, thereby forming the second current flowing through each photosensitive component. At this time, each photosensitive component changes from a forward biased state to a reverse biased state in preparation for the subsequent photoelectric conversion. Then, the scanning signals controlling each of the switch transistors change from a high level to a low level so that each of the switch transistors is turned off.

Then, the acquisition period P2 is started.

After starting the acquisition period P2, for example, the first scanning signal GS1 is first controlled to change from a low level to a high level so that the first switch transistor ST1 is turned on. At this time, charges remained in the first photosensitive component PIN1 can be released through the first switch transistor ST1 and the first calculation amplifier OA1, and then the first scanning signal GS1 is controlled to change from the high level to the low level. This operation is equivalent to resetting the first photosensitive component PIN1.

Then, similarly to the above, the second photosensitive components PIN2, ..., and the Nth photosensitive component PINN are reset sequentially.

Then, the reference scanning signal GSR is changed from a low level to a high level so that the reference switch transistor STR is turned on, at this time, the reference signal amount acquired by the reference photosensitive component PINR is provided to the inverting input terminal of the first calculation amplifier OA1 through the turned-on reference switch transistor STR, and the first reference value DTR is output after the reference signal amount is processed by the first calculation amplifier OA1 and the first capacitor C1.

After reset, other photosensitive components, except the reference photosensitive component PINR, begin to perform the photoelectric conversion on the received light from the texture. For example, the first photosensitive component PIN1 is described as an example here. The first photosensitive component PIN1 performs photoelectric conversion on the received light from the texture and accumulates the first signal amount that is acquired through converting the light from the texture.

Then, the first scanning signal GS1 changes from a low level to a high level, the first switch transistor ST1 is turned on, the first signal amount accumulated by the first photosensitive component PIN1 can be supplied to the inverting input terminal of the first calculation amplifier OA1 through the turned-on first switch transistor ST1, and the first acquisition value DT2 is output after the first signal amount is processed by the first calculation amplifier OA1 and the first capacitor C1.

Similarly to the above, the second switch transistor ST2, ..., the Nth switch transistor STN are turned on sequentially, and the first calculation amplifier OA1 sequentially outputs the second acquisition value DT2, ..., the Nth acquisition value DTN.

For example, the first acquisition value DT1, the second acquisition value DT2, ..., the Nth acquisition value DTN, and the first reference value DTR can be provided to the processing circuit for further data processing, thereby finally acquiring the texture image. For example, during data processing, the first reference value DTR is respectively subtracted from the first acquired value DT1, the second acquired value DT2, ..., and the Nth acquired value DTN, so that noise caused by the first current can be partially or completely eliminated.

Figure 10:
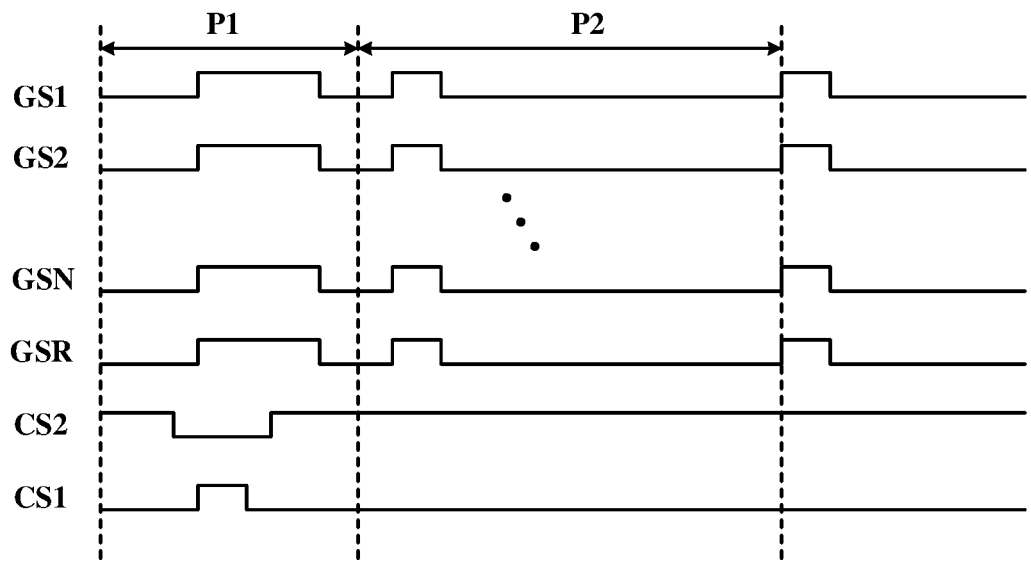
FIG. 10 is a signal timing diagram for the texture image acquisition circuit illustrated in FIG. 8 provided by at least one embodiment of the present disclosure.

FIG. 10 illustrates a signal timing diagram for the texture image acquisition circuit 10 illustrated in FIG. 8. As illustrated in FIG. 8 and FIG. 10, this embodiment differs from the above embodiment in that, because in the texture image acquisition circuit 10 illustrated in FIG. 8, each acquisition circuit includes a calculation amplifier and a capacitor, each switch transistor can be turned on simultaneously in the acquisition period P2, so that the first calculation amplifier OA1, the second calculation amplifier OA2, ..., and the Nth calculation amplifier OAN can respectively output the first acquisition value DT1, the second acquisition value DT2, ..., and the Nth acquisition value DTN. For other operations, reference can be made to the corresponding descriptions in the above-mentioned embodiments, which will not be repeated herein.

Figure 12:
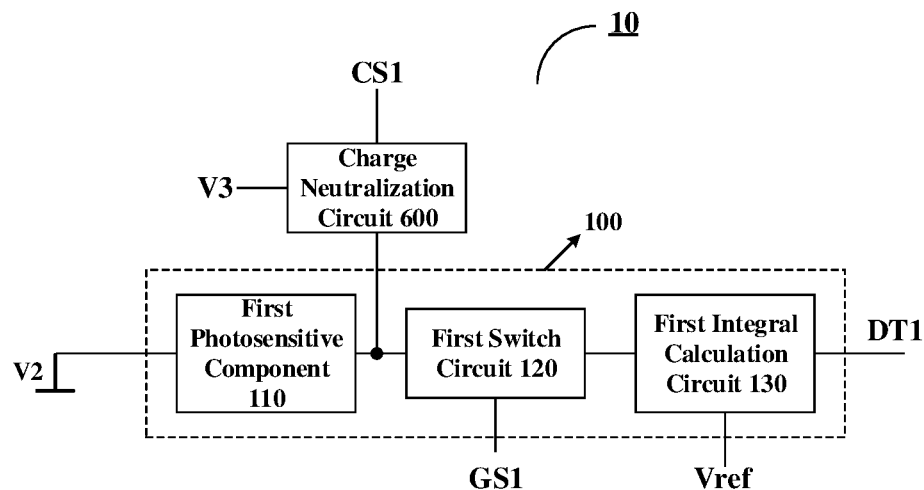
FIG. 12 is a schematic diagram of yet another texture image acquisition circuit provided by at least one embodiment of the present disclosure.

In the texture image acquisition circuit 10 provided by some other embodiments of the present disclosure, as illustrated in FIG. 12, the first electrode of the first photosensitive component 110 is configured to receive the second voltage V2, and the second electrode of the first photosensitive component 110 is also electrically connected to the charge neutralization circuit 600.

For example, the charge neutralization circuit 600 is configured to provide the third voltage V3 to the second electrode of the first photosensitive component 110 when receiving the first control signal CS1. For example, the third voltage V3 is less than the second voltage V2. For example, the third voltage V3 is −4.5 V or −5 V. The embodiments of the present disclosure do not limit the specific value of the third voltage V3.

For example, the charge neutralization circuit 600 is configured to receive the third voltage V3, the first switch circuit 120 is configured to receive the first scan signal GS1, and the first integral calculation circuit 130 is configured to receive the reference voltage Vref.

For example, in an acquisition interval of two frames of texture images (such as the above-mentioned charge neutralization period P1), the charge neutralization circuit 600 transmits the third voltage V3 to the second electrode of the first photosensitive component 110 under the control of the first control signal CS1. At the same time, the first electrode of the first photosensitive component 110 also receives the second voltage V2, therefore the voltages applied to the two electrodes of the first photosensitive component 110 at this time are the second voltage V2 and the third voltage V3, which causes the current flowing through the first photosensitive component 110 to be the first current, and the direction of the first current is from the first electrode of the first photosensitive component 110 to the second electrode of the first photosensitive component 110. The residual charges in the first photosensitive component 110 are partially or completely neutralized by the first current.

Then, before the acquisition of the next frame is started, the charge neutralization circuit 600 is turned off under the control of the first control signal CS1. At the same time, the first switch circuit 120 is kept in the on state under the control of the first scanning signal GS1, at this time the voltages applied to the two electrodes of the first photosensitive component 110 are controlled to be the second voltage V2 and the reference voltage Vref. For example, the second voltage V2 is less than the reference voltage Vref. Under the action of the second voltage V2 and the reference voltage Vref, the current flowing through the first photosensitive component 110 is made to be a second current, and the direction of the second current and the direction of the first current are opposite to each other. For example, the first photosensitive component 110 is in the forward biased state when the first current is applied, and the first photosensitive component 110 is in the reverse biased state when the second current is applied. For example, the first photosensitive component 110 can perform normal acquisition operations when being in the reverse biased state, for example, can receive the light from a texture, perform the photoelectric conversion on the received light to generate charges, and then for example, can perform the analog-to-digital conversion on the charges, so as to acquire the signal amount corresponding to the texture.

Then, the next frame acquisition period (for example, the acquisition period P2 described above) is started, at this time the first switch circuit 120 is turned off under the control of the first scanning signal GS1, the first photosensitive component 110 receives the light from the texture, and accumulates the first signal amount that is acquired through converting the light from the texture. Then, the first switch circuit 120 is turned on under the control of the first scanning signal GS1, and the first integral calculation circuit 130 receives the first signal amount and performs integral calculation on the first signal amount to acquire the first acquisition value DT1.

Figure 13:
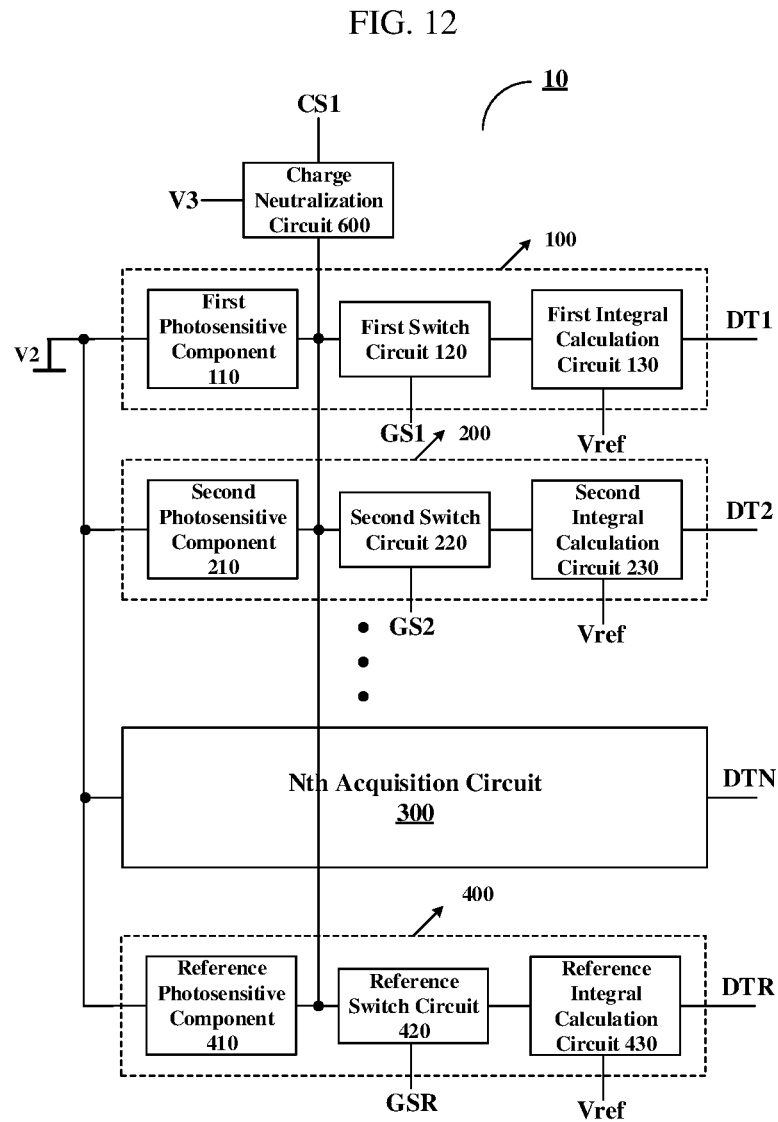
FIG. 13 is a schematic diagram of yet another texture image acquisition circuit provided by at least one embodiment of the present disclosure.

For example, as illustrated in FIG. 13, similar to FIG. 7, the texture image acquisition circuit 10 may further include a second acquisition circuit 200, . . . , an Nth acquisition circuit 300, and a reference acquisition circuit 400. The detailed description of the second acquisition circuit 200, the Nth acquisition circuit 300, and the reference acquisition circuit 400 can refer to the corresponding descriptions in the above-mentioned embodiments, and is not repeated herein.

The implementation of the texture image acquisition circuit 10 illustrated in FIG. 13 is described below with reference to FIG. 14.

Figure 14:
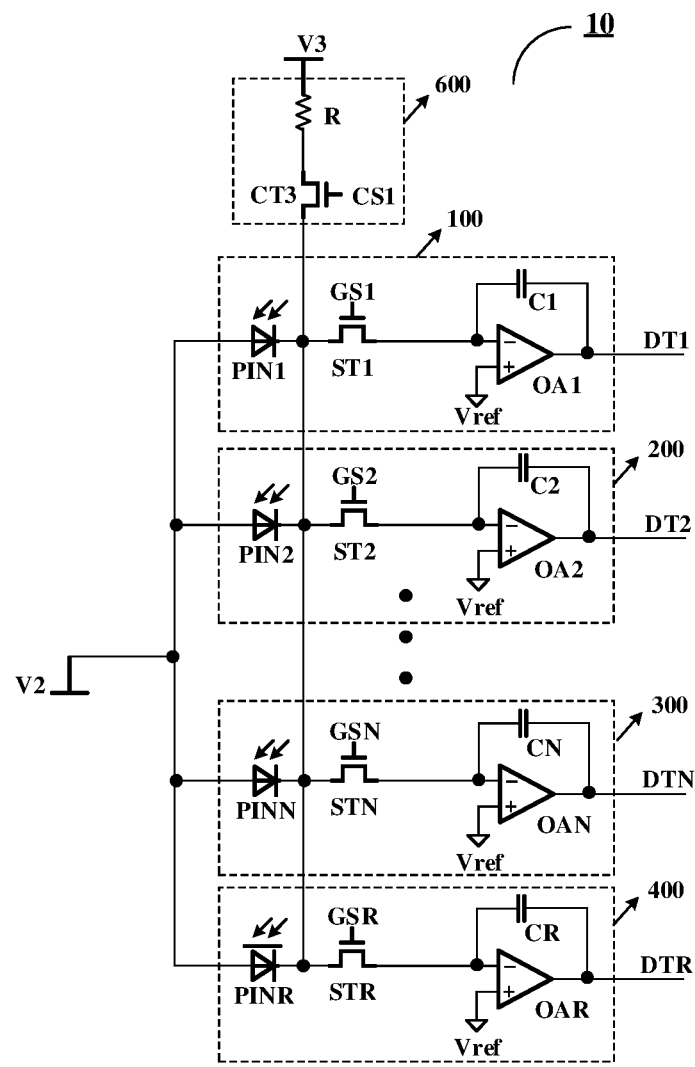
FIG. 14 is a schematic diagram of yet another texture image acquisition circuit provided by at least one embodiment of the present disclosure.

As illustrated in FIG. 14, in some embodiments, the charge neutralization circuit 600 is implemented as a third control transistor CT3. The gate electrode of the third control transistor CT3 is configured to receive the first control signal CS1, and the first electrode of the third control transistor CT3 is configured to receive the third voltage V3. For example, the charge neutralization circuit 600 can further include an adjustment resistor R to cause the first electrode of the third control transistor CT3 to receive the third voltage V3 through the adjustment resistor R. For example, by controlling the resistance value of the adjustment resistor R, the voltage value applied to the first electrode of the third control transistor CT3 can be adjusted. The second electrode of the third control transistor CT3 is connected to the second electrode of the first photosensitive component PIN1.

For example, the first switch circuit 120 may be implemented as the first switch transistor ST1, and the first integral calculation circuit 130 can be implemented as including the first calculation amplifier OA1 and the first capacitor C1. The gate electrode of the first switch transistor ST1 is configured to receive the first scanning signal GS1, the first electrode of the first switch transistor ST1 is connected to the second electrode of the first photosensitive component PIN1, and the second electrode of the first switch transistor ST1 is connected to the inverting input terminal of the first calculation amplifier OA1. The non-inverting input terminal of the first calculation amplifier OA1 is configured to receive the reference voltage Vref, and the output terminal of the first calculation amplifier OA1 is configured to output the first acquisition value DT1. The first electrode of the first capacitor C1 is connected to the inverting input terminal of the first calculation amplifier OA1, and the second electrode of the first capacitor C1 is connected to the output terminal of the first calculation amplifier OA1.

The connection relationship of the other devices in FIG. 14 can be referred to the corresponding description in the above-mentioned embodiment, which is not repeated herein.

Figure 15:
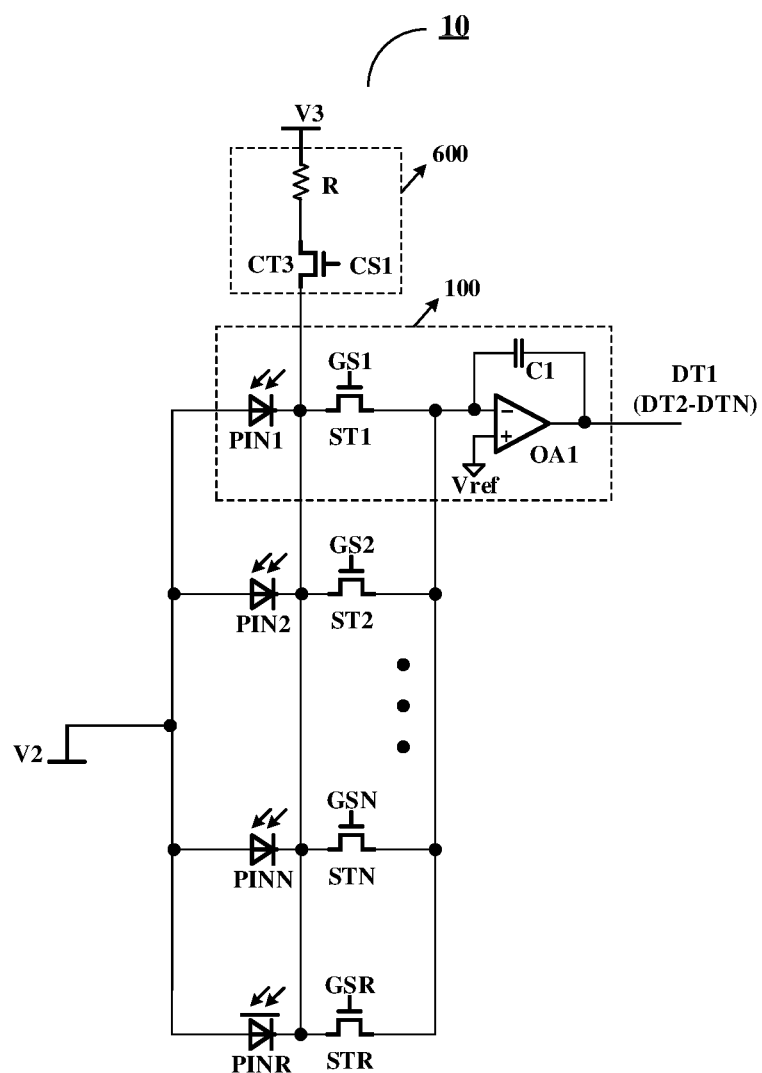
FIG. 15 is a schematic diagram of yet another texture image acquisition circuit provided by at least one embodiment of the present disclosure.

Some embodiments of the present disclosure further provide a texture image acquisition circuit 10. As illustrated in FIG. 15, the texture image acquisition circuit 10 differs from the texture image acquisition circuit 10 illustrated in FIG. 14 in that all the acquisition circuit in the texture image acquisition circuit 10 illustrated in FIG. 15 share the same integral calculation circuit, i.e., share the first calculation amplifier OA1 and the first capacitor C1. In this case, it is required that the first switch transistor ST1, the second switch transistor ST2, . . . , the Nth switch transistor STN, and the reference switch transistor STR to be respectively turned on at different periods of time, so that the first calculation amplifier OA1 can respectively output the first acquisition value DT1, the second acquisition value DT2, . . . , the Nth acquisition value DTN, and the first reference value DTR at the different periods of time.

The operation principle of the texture image acquisition circuit 10 illustrated in FIG. 15 is described below with reference to the signal timing diagram illustrated in FIG. 17.

Figure 17:
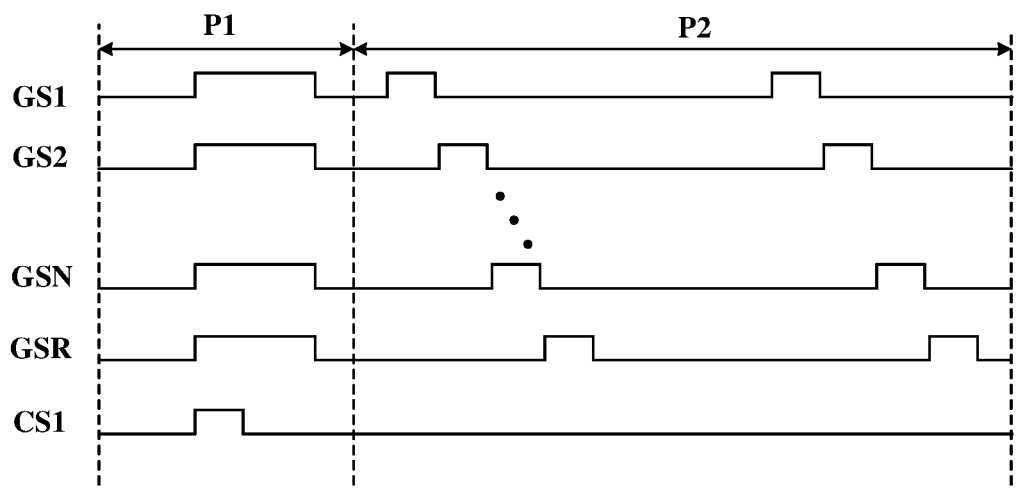
FIG. 17 is a signal timing diagram for the texture image acquisition circuit illustrated in FIG. 15 provided by at least one embodiment of the present disclosure.

As illustrated in FIG. 15 and FIG. 17, in the charge neutralization period P1, the scanning signals controlling each of the switch transistors are controlled to be a high level, so that each of the switch transistors is turned on, at the same time, the first control signal CS1 controlling the third control transistor CT3 is controlled to be a high level, so that the third control transistor CT3 is turned on. The third voltage V3 is supplied to the second electrode (e.g., cathode) of each of the photosensitive components (first photosensitive component PIN1, second photosensitive component PIN2, . . . , Nth photosensitive component PINN, reference photosensitive component PINR) after passing through the adjusting resistor R and the turned-on third control transistor CT3. At this time, each photosensitive component is in the forward biased state, thereby forming a first current flowing through each photosensitive component. Under the action of the first current, the residual charges in each photosensitive component (excluding the reference photosensitive component here) is partially or completely neutralized. At this time, the reference photosensitive component PINR can accumulate the first current to acquire the reference signal amount.

Then, the first control signal CS1 changes to a low level, and the third control transistor CT3 is turned off. Because each of the switch transistors is still in the on state, the voltages applied to the two electrodes of the first photosensitive component 110 are the second voltage V2 and the reference voltage Vref, and under the action of the second voltage V2 and the reference voltage Vref, the current flowing through the first photosensitive component 110 is the second current, the direction of the second current and the direction of the first current are opposite to each other. Therefore, at this time, each of the photosensitive components changes from a forward biased state to a reverse biased state in preparation for the subsequent photoelectric conversion. Then, the scanning signal of each switch transistor is controlled to change from a high level to a low level, so each switch transistor is turned off.

Then, the acquisition period P2 is started. Because the operation principle after starting the acquisition period P2 is similar to that of the above-mentioned embodiments, which is not be repeated herein.

Figure 16:
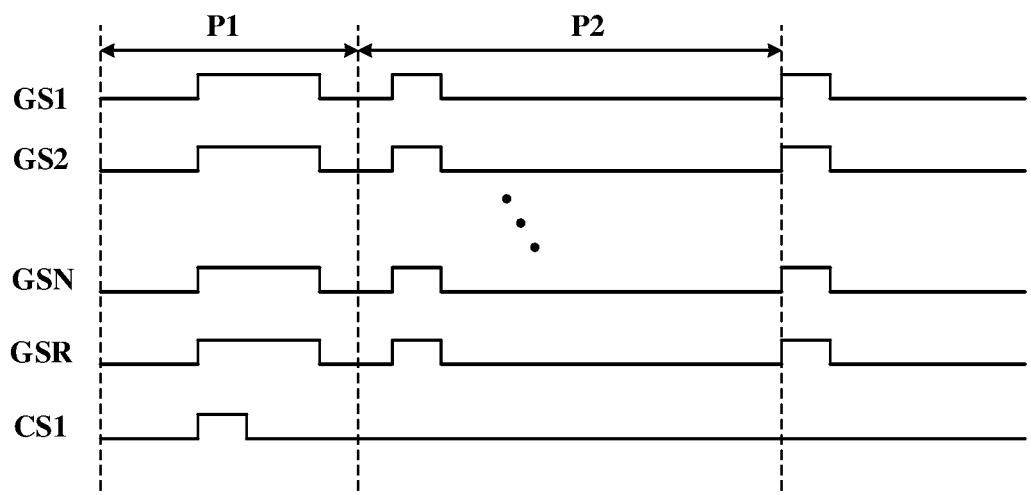
FIG. 16 is a signal timing diagram for the texture image acquisition circuit illustrated in FIG. 14 provided by at least one embodiment of the present disclosure.

FIG. 16 illustrates a signal timing diagram for the texture image acquisition circuit 10 illustrated in FIG. 14. As illustrated in FIG. 14 and FIG. 16, this embodiment differs from the above embodiment in that, because in the texture image acquisition circuit 10 illustrated in FIG. 14, each of the acquisition circuits includes a calculation amplifier and a capacitor, each of the switch transistors can be turned on simultaneously in the acquisition period P2, so that the first calculation amplifier OA1, the second calculation amplifier OA2, . . . , and the Nth calculation amplifier OAN can respectively output the first acquisition value DT1, the second acquisition value DT2, . . . , and the Nth acquisition value DTN. Other operations can be referred to the corresponding descriptions in the above-mentioned embodiments, and are not repeated herein.

Figure 18:
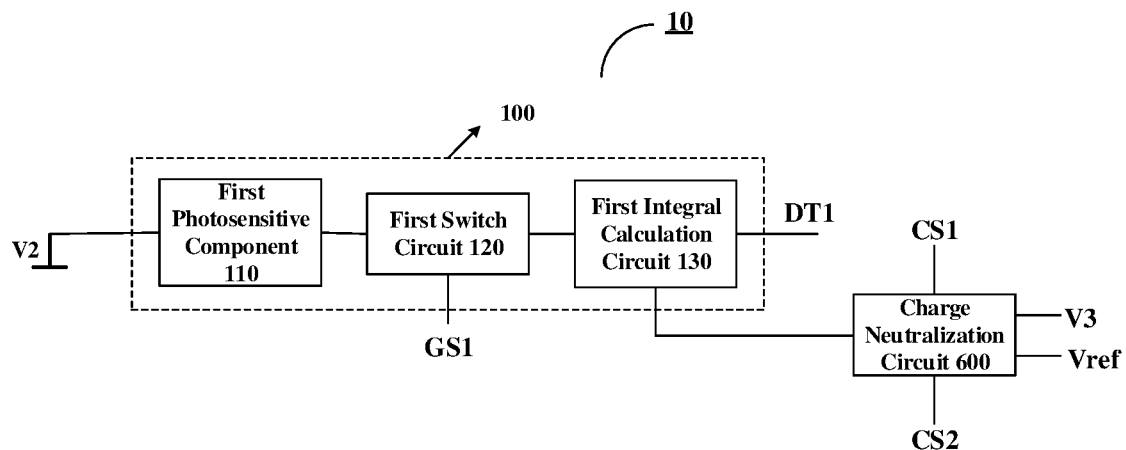
FIG. 18 is a schematic diagram of yet another texture image acquisition circuit provided by at least one embodiment of the present disclosure.

In the texture image acquisition circuit 10 provided by some other embodiments of the present disclosure, as illustrated in FIG. 18, the first electrode of the first photosensitive component 110 is configured to receive the second voltage V2, and the first integral calculation circuit 130 is further connected to the charge neutralization circuit 600 which is configured to provide the third voltage V3 to the first integral calculation circuit 130 when receiving the first control signal CS1, and is configured to provide the reference voltage Vref to the first integral calculation circuit 130 when receiving the second control signal CS2.

For example, the third voltage V3 is less than the second voltage V2, and the reference voltage Vref is larger than the second voltage V2.

For example, the charge neutralization circuit 600 is configured to receive the third voltage V3 and the reference voltage Vref, and the first switch circuit 120 is configured to receive the first scanning signal GS1.

For example, during the acquisition interval of two frames of texture images (such as the above-mentioned charge neutralization period P1), the charge neutralization circuit 600 transmits the third voltage V3 to the first integral calculation circuit 130 under the control of the first control signal CS1. At the same time, the first electrode of the first photosensitive component 110 also receives the second voltage V2, therefore the voltages applied to the two electrodes of the first photosensitive component 110 at this time are the second voltage V2 and the third voltage V3, so that the current flowing through the first photosensitive component 110 is the first current, and the direction of the first current is from the first electrode of the first photosensitive component 110 to the second electrode of the first photosensitive component 110. The residual charges in the first photosensitive component 110 are partially or completely neutralized by the first current.

Then, before the acquisition of the next frame is started, the charge neutralization circuit 600 transmits the reference voltage Vref to the first integral calculation circuit 130 under the control of the second control signal CS2. At the same time, the first switch circuit 120 is kept in an on state under the control of the first scanning signal GS1, at this time, the voltage applied to the two electrodes of the first photosensitive component 110 are the second voltage V2 and the reference voltage Vref, and the current flowing through the first photosensitive component 110 is the second current under the action of the second voltage V2 and the reference voltage Vref, and the directions of the second current and the first current are opposite to each other. For example, the first photosensitive component 110 is in the forward biased state when the first current is applied, and the first photosensitive component 110 is in the reverse biased state when the second current is applied. For example, the first photosensitive component 110 can perform normal acquisition operation when being in the reverse biased state, for example, it can receive the light from the texture, perform the photoelectric conversion on the received light to generate charges, and then for example, perform the analog-to-digital conversion on the charges, so as to acquire the signal amount corresponding to the texture.

Then, the next frame acquisition period (for example, the acquisition period P2 described above) is started, at this time, the first switch circuit 120 is turned off under the control of the first scanning signal GS1, the first photosensitive component 110 receives the light from the texture, and accumulates the first signal amount that is acquired through converting the light from the texture. Then, the first switch circuit 120 is turned on under the control of the first scanning signal GS1, and the first integral calculation circuit 130 receives the first signal amount and performs integral calculation on the first signal amount to acquire the first acquisition value DT1.

Figure 19:
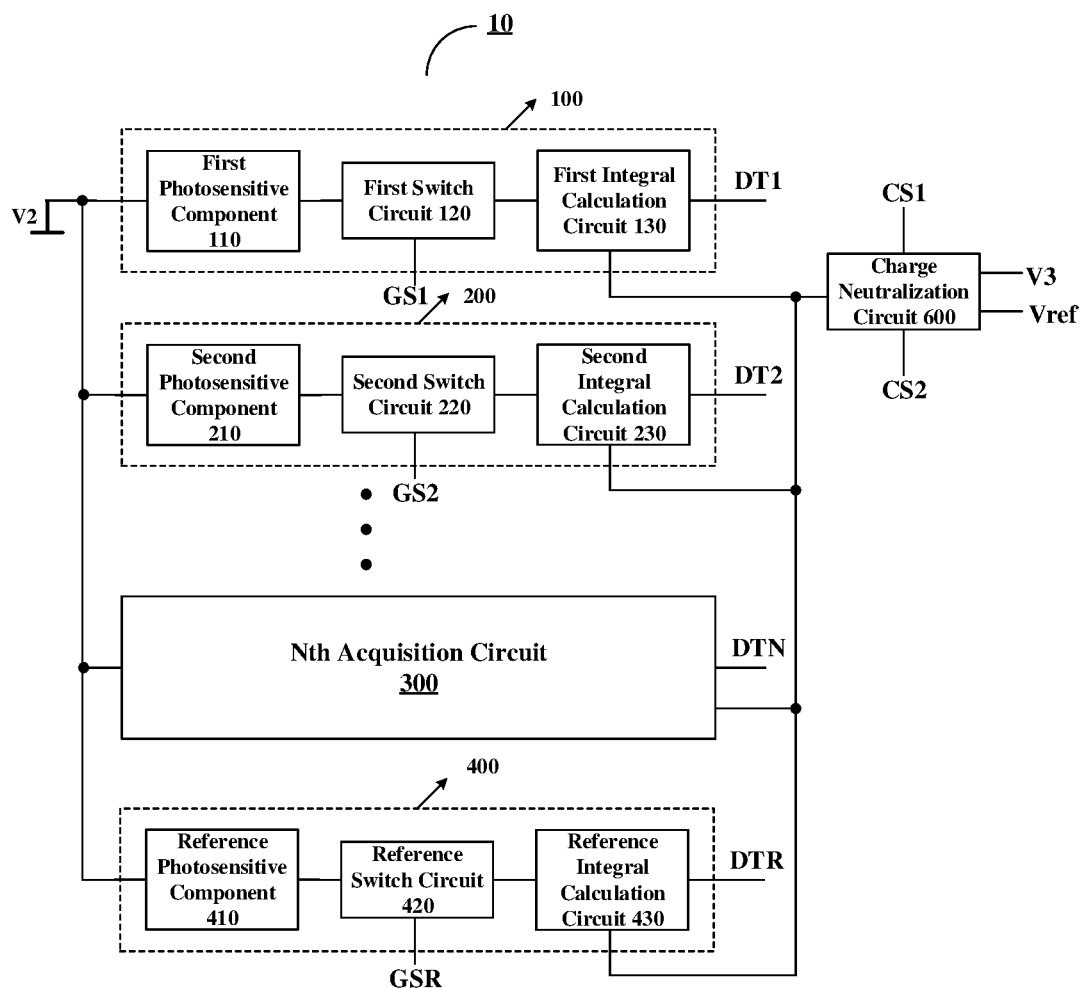
FIG. 19 is a schematic diagram of yet another texture image acquisition circuit provided by at least one embodiment of the present disclosure.

For example, as illustrated in FIG. 19, similar to FIG. 7, the texture image acquisition circuit 10 may further include the second acquisition circuit 200, . . . , the Nth acquisition circuit 300, and the reference acquisition circuit 400. The detailed description of the second acquisition circuit 200, the Nth acquisition circuit 300, and the reference acquisition circuit 400 can be referred to the corresponding descriptions in the above-mentioned embodiments, and is not repeated herein.

The implementation of the texture image acquisition circuit 10 illustrated in FIG. 19 will be described below with reference to FIG. 20.

Figure 20:
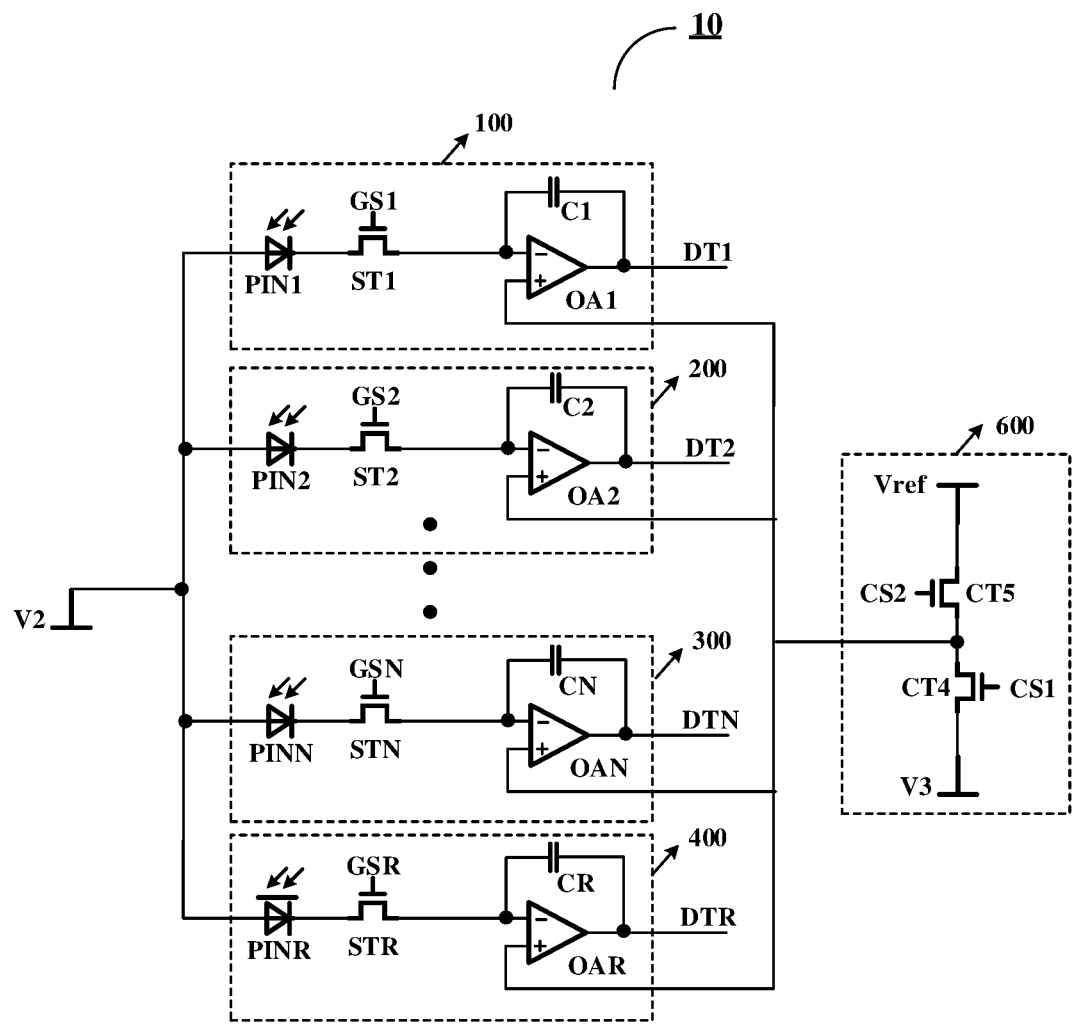
FIG. 20 is a schematic diagram of yet another texture image acquisition circuit provided by at least one embodiment of the present disclosure.

As illustrated in FIG. 20, in some embodiments, the charge neutralization circuit 600 can be implemented to include a fourth control transistor CT4 and a fifth control transistor CT5, the first switch circuit 120 can be implemented to include the first switch transistor ST1, and the first integral calculation circuit 130 can be implemented to include the first calculation amplifier OA1 and the first capacitor C1.

The gate electrode of the fourth control transistor CT4 is configured to receive the first control signal CS1, the first electrode of the fourth control transistor CT4 is configured to receive the third voltage V3, and the second electrode of the fourth control transistor CT4 is connected to the non-inverting input terminal of the first calculation amplifier OA1.

The gate electrode of the fifth control transistor CT5 is configured to receive the second control signal CS2, the first electrode of the fifth control transistor CT5 is configured to receive the reference voltage Vref, and the second electrode of the fifth control transistor CT5 is connected to the non-inverting input terminal of the first calculation amplifier OA1.

The gate electrode of the first switch transistor ST1 is configured to receive the first scanning signal GS1, the first electrode of the first switch transistor ST1 is connected to the second electrode (e.g., cathode) of the first photosensitive component PIN1, and the second electrode of the first switch transistor ST1 is connected to the inverting input terminal of the first calculation amplifier OA1. The output terminal of the first calculation amplifier OA1 is configured to output a first acquisition value DT1. The first electrode of the first capacitor C1 is connected to the inverting input terminal of the first calculation amplifier OA1, and the second electrode of the first capacitor C1 is connected to the output terminal of the first calculation amplifier OA1.

The connection relationship of the other devices in FIG. 20 can be referred to the corresponding description in the above embodiment, and is not described herein again.

Figure 21:
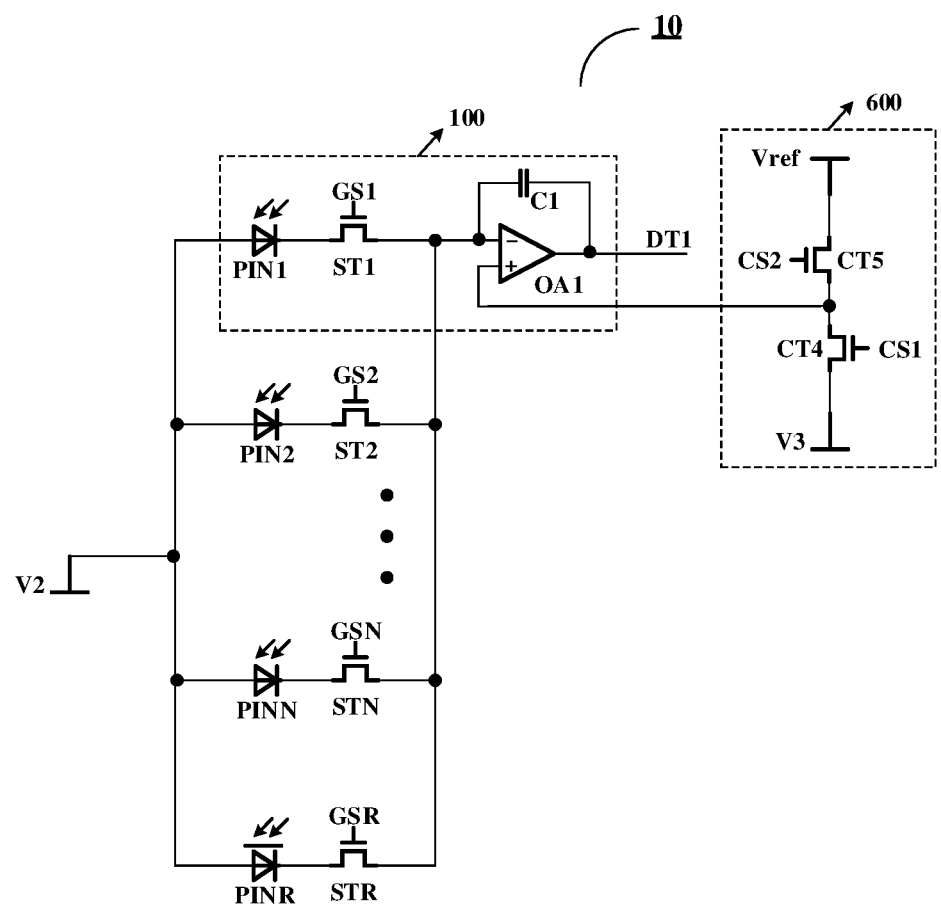
FIG. 21 is a schematic diagram of yet another texture image acquisition circuit provided by at least one embodiment of the present disclosure.

Some embodiments of the present disclosure further provide a texture image acquisition circuit 10. As illustrated in FIG. 21, the texture image acquisition circuit 10 differs from the texture image acquisition circuit 10 illustrated in FIG. 20 in that all the acquisition circuit in the texture image acquisition circuit 10 illustrated in FIG. 21 share the same integral calculation circuit, i.e., share the first calculation amplifier OA1 and the first capacitor C1. In this case, it is required that the first switch transistor ST1, the second switch transistor ST2, . . . , the Nth switch transistor STN, and the reference switch transistor STR to be respectively turned on at different periods of time, so that the first calculation amplifier OA1 can respectively output the first acquisition value DT1, the second acquisition value DT2, . . . , the Nth acquisition value DTN, and the first reference value DTR at the different periods of time.

The operation principle of the texture image acquisition circuit 10 illustrated in FIG. 21 is described below with reference to the signal timing diagram illustrated in FIG. 11.

As illustrated in FIG. 11 and FIG. 21, during the charge neutralization period P1, before the scanning signals (first scanning signal GS1, second scanning signal GS2, Nth scanning signal GSN, reference scanning signal GSR) controlling each of the switch transistors (first switch transistor ST1, second switch transistor ST2, . . . , Nth switch transistor STN, reference switch transistor STR) changes to be a high level, the second control signal CS2 that controls the second control transistor CT2 is first controlled to be a low level, so that the fifth control transistor CT5 is turned off. Then, the scanning signals controlling each of the switch transistors are controlled to be a high level, so that each of the switch transistors is turned on, at the same time, the first control signal CS1 controlling the fourth control transistor CT4 is controlled to be a high level, so that the fourth control transistor CT4 is turned on, and the third voltage V3 is supplied to the non-inverting input terminal of the first calculation amplifier OA1 through the turned-on fourth control transistor CT4, and at this time, each of the photosensitive components is in the forward biased state, thereby forming the first current flowing through each photosensitive component. Under the action of the first current, the residual charges in each of the photosensitive components (excluding the reference photosensitive component here) is partially or completely neutralized. In this case, the reference photosensitive component PINR can accumulate the first current to acquire the reference signal amount.

Then, the first control signal CS1 changes to be a low level, and the fourth control transistor CT4 is turned off. Then, the second control signal CS2 changes to be a high level, and the fifth control transistor CT5 is turned on. The reference voltage Vref is supplied to the non-inverting input terminal of the first calculation amplifier OA1 through the turned-on fifth control transistor CT5, thereby forming a second current flowing through each of the photosensitive components. At this time, each photosensitive component is changed from the forward biased state to the reverse biased state in preparation for the subsequent photoelectric conversion. Then, the scanning signals of each of the switch transistors are controlled to change from a high level to a low level, so each of the switch transistors is turned off.

Then, the acquisition period P2 is started. Because the operation principle after starting the acquisition period P2 is similar to that of the above-mentioned embodiments, which is not repeated herein.

It should be noted that the signal timing illustrated in FIG. 10 can be used in the texture image acquisition circuit 10 illustrated in FIG. 20. As illustrated in FIG. 10 and FIG. 20, this embodiment differs from the above embodiment in that, because in the texture image acquisition circuit 10 illustrated in FIG. 20, each acquisition circuit includes an calculation amplifier and a capacitor, each switch transistor can be turned on simultaneously in the acquisition period P2. Therefore, the first calculation amplifier OA1, the second calculation amplifier OA2, . . . , and the Nth calculation amplifier OAN can respectively output the first acquisition value DT1, the second acquisition value DT2, . . . , and the Nth acquisition value DTN. Other operations, can be referred to the corresponding descriptions in the above-mentioned embodiments, and are not repeated herein.

It should be noted that in the embodiments of the present disclosure, the first acquisition value DT1, the second acquisition value DT2, . . . , the Nth acquisition value DTN, and the first reference value DTR can be voltage values, for example, and the embodiments of the present disclosure include but are not limited to this.

Figure 22:
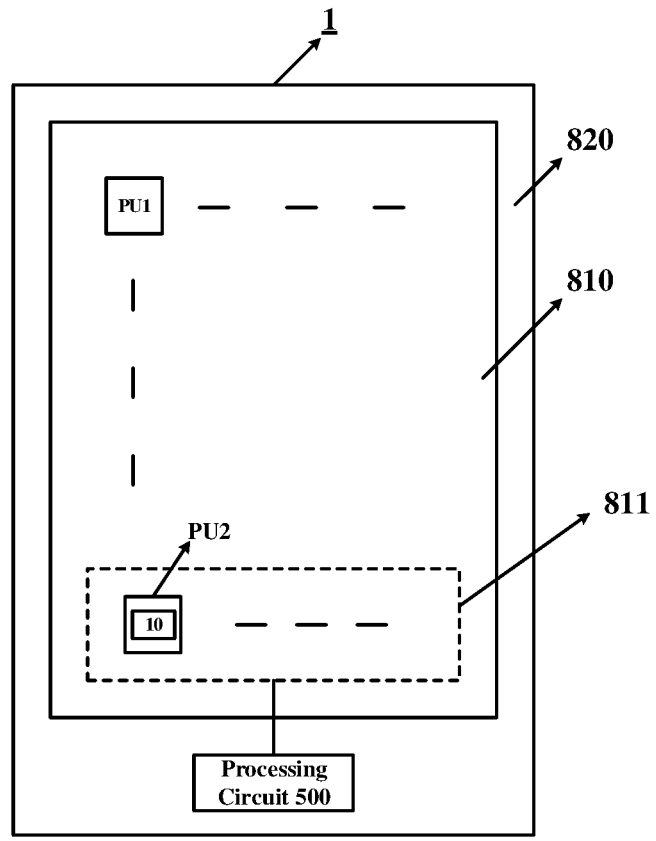
FIG. 22 is a schematic diagram of a display panel provided by at least one embodiment of the present disclosure.

At least one embodiment of the present disclosure further provides a display panel 1. As illustrated in FIG. 22, the display panel 1 includes a display region 810, the display region 810 includes a texture recognition region 811. It should be noted that in the embodiment of the present disclosure, the texture recognition region 811 is a region where the operation body performs the texture recognition on the display panel 1. The size of the texture recognition region 811 illustrated in FIG. 22 is only schematic. For example, the size of the texture recognition region 811 may be the same as the size of the display region 810, that is, the operation body can perform the texture recognition at any position of the display region 810 of the display panel 1.

It should be noted that in the embodiments of the present disclosure, the operation body with textures may be a hand, and in this case, the textures in the texture image acquisition method are skin textures, such as fingerprints, palmprints, etc. In addition, the operation body with textures can also be non-living bodies with certain textures, such as objects with certain textures made of materials such as resin, and the embodiments of the present disclosure are not specifically limited to this.

For example, as illustrated in FIG. 22, a pixel unit array is provided in the display region 810, and the pixel unit array includes a plurality of pixel units arranged in an array. Herein, in order to distinguish different pixel units, for example, pixel units located in the texture recognition region 811 are labeled PU2, and pixel units located in the display region 810 but not in the texture recognition region 811 are labeled PU1.

For example, each of the pixel units PU2 located in the texture recognition region 811 includes any one of the texture image acquisition circuits 10 provided by the embodiments of the present disclosure. For example, the texture image acquisition circuit 10 can be directly formed on the display substrate of the display panel 1 by adopting a thin film process.

For example, each pixel unit (including pixel unit PU1 and pixel unit PU2) includes a thin film transistor and a light emitting device, the light emitting device includes, for example, an anode, a cathode, and a light emitting layer between the anode and the cathode. For example, the pixel unit array of the display panel 1 is implemented to be a light source array, and the plurality of pixel units are implemented to be a plurality of light sources. That is, the pixel units of the display panel 1 also serve as photosensitive light sources, so that the compactness of the display panel can be improved and the arrangement difficulty of each functional structure can be reduced. For example, each photosensitive light source includes one or more pixel units, so that the photosensitive light source can be formed into a light source in a certain shape, such as a point light source, a line light source, a Z-shaped light source, a light source in a shape of "回", or the like, through different arrangements of the one or more pixel units.

For example, the pixel units in the entire display region 810 of the display panel 1 may be controlled to as also serve as the photosensitive light sources, and the texture image acquisition circuit 10 may also be arranged in each pixel unit accordingly, thereby realizing the full-screen texture recognition.

For example, as illustrated in FIG. 22, the display panel 1 further includes a peripheral region 820 surrounding the display region 810. The display panel 1 further includes a processing circuit 500 which is arranged, for example, in the peripheral region 820. For example, the processing circuit 500 is electrically connected to the first acquisition circuit 100 and is configured to process the first acquisition value DT1 to acquire an image of the texture. For example, the processing circuit 500 can be connected to the output terminal of the first calculation amplifier OA1 in the first acquisition circuit 100 to receive the first acquisition value DT1.

For example, in the case where the texture image acquisition circuit 10 includes the reference acquisition circuit 400, the processing circuit 500 is also electrically connected to the reference acquisition circuit 400 and is configured to process the first acquisition value DT1 and the first reference value DTR to acquire an image of the texture.

For example, in the case where the texture image acquisition circuit 10 includes the second acquisition circuit 200, . . . , the Nth acquisition circuit 300, the processing circuit 500 is also electrically connected to the plurality of acquisition circuits to receive a plurality of acquisition values, so that the plurality of acquisition values can be processed to acquire an image of the texture.

The processing circuit 500 can be implemented using a general purpose processor or a special purpose processor, and the embodiments of the present disclosure are not limited thereto.

In the display panel 1 provided in the above embodiment, the texture image acquisition circuit 10 is directly formed on the display substrate of the display panel 1 and integrated in the pixel unit PU2. In this case, the pixel unit PU2 can also serve as the photosensitive light source of the texture image acquisition circuit 10. Embodiments of the present disclosure include but are not limited to this, for example, the texture image acquisition circuit 10 can be separately provided, for example, the texture image acquisition circuit 10 is attached to the back surface of the display substrate of the display panel 1, in this case, it is necessary to separately provide a light emitting element as a photosensitive light source of the texture image acquisition circuit 10.

For example, the display panel 1 is an organic light emitting diode (OLED) display panel or a quantum dot light emitting diodes (QLED) display panel, etc. The embodiments of the present disclosure are not specifically limited to this. The OLED display panel can be, for example, a flexible OLED display panel. OLED display panel has self-luminous characteristics, and the light emission of its pixel units can also be controlled or modulated according to needs, thus providing convenience to the acquisition of texture images and helping to improve the integration level.

The display panel 1 provided by the embodiments of the present disclosure can partially or completely neutralize the residual charges in the photosensitive component, thereby improving or avoiding the afterimage phenomenon caused by the residual charges, thus improving the effectiveness and accuracy of texture image acquisition, and finally improving the precision of texture recognition of the display panel.

At least one embodiment of the present disclosure further provides a display device which includes any display panel 1 provided in the embodiments of the present disclosure. The display device in this embodiment can be any product or component with display function such as a liquid crystal panel, a liquid crystal television, a display, an OLED panel, an OLED television, electronic paper, a mobile phone, a tablet computer, a notebook computer, a digital photo frame, a navigator, etc.

The technical effect of the display device provided by the embodiment of the present disclosure can be referred to the corresponding description of the texture image acquisition circuit and the display panel 1 in the above embodiments, and is not described herein again.

Figure 23:
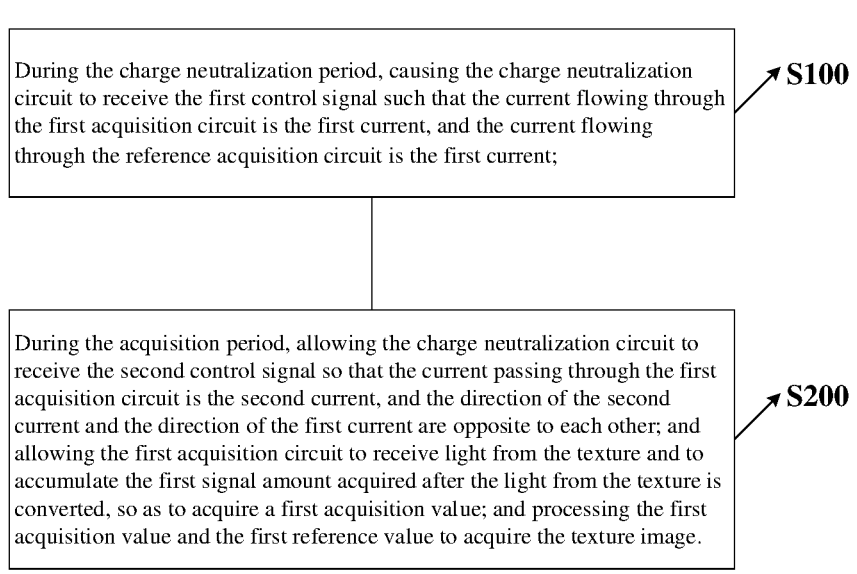
FIG. 23 is a schematic diagram of a texture image acquisition method provided by at least one embodiment of the present disclosure.

At least one embodiment of the present disclosure further provides a texture image acquisition method for the texture image acquisition circuit 10. As illustrated in FIG. 23, the texture image acquisition method includes the following operation steps.

Step S100: during the charge neutralization period P1, allowing the charge neutralization circuit 600 to receive the first control signal CS1 to cause the current flowing through the first acquisition circuit 100 to be the first current, and the current flowing through the reference acquisition circuit 400 is the first current.

Step S200: during the acquisition period P2, allowing the charge neutralization circuit 600 to receive the second control signal CS2 to cause the current flowing through the first acquisition circuit 100 to be the second current, and the direction of the second current and the direction of the first current are opposite to each other; allowing the first acquisition circuit 100 to receive light from the texture and to accumulate the first signal amount that is acquired through converting the light from the texture, so as to acquire a first acquisition value DT1; and processing the first acquisition value DT1 and the first reference value DTR to acquire the texture image.

The detailed description and technical effect of the texture image acquisition method provided by the embodiments of the present disclosure can be referred to the corresponding description of the texture image acquisition circuit 10 in the above embodiments, and are not be described herein again.

What have been described above are only specific implementations of the present disclosure, the protection scope of the present disclosure is not limited thereto. The protection scope of the present disclosure should be based on the protection scope of the claims.

What is claimed is:

1. A texture image acquisition circuit, comprising a charge neutralization circuit and a first acquisition circuit, wherein
    the charge neutralization circuit is electrically connected to the first acquisition circuit,
    the charge neutralization circuit is configured to receive a first control signal to cause a current flowing through the first acquisition circuit to be a first current, and the charge neutralization circuit is further configured to receive a second control signal to cause the current flowing through the first acquisition circuit to be a second current, and a direction of the second current and a direction of the first current are opposite to each other;
    the first acquisition circuit is configured to receive light from a texture and accumulate a first signal amount that is acquired through converting the light from the texture, so as to acquire a first acquisition value.

2. The texture image acquisition circuit according to claim 1, wherein
    the first acquisition circuit comprises a first photosensitive component, a first switch circuit and a first integral calculation circuit;
    a second electrode of the first photosensitive component is connected to the first switch circuit, and the first switch circuit is further connected to the first integral calculation circuit;
    the first photosensitive component is configured to receive the light from the texture and accumulate the first signal amount that is acquired through converting the light from the texture; and
    the first integral calculation circuit is configured to receive the first signal amount and perform integral calculation on the first signal amount, so as to acquire the first acquisition value.

3. The texture image acquisition circuit according to claim 2, wherein
    a first electrode of the first photosensitive component is configured to be connected to the charge neutralization circuit;
    the charge neutralization circuit is configured to provide a first voltage to the first electrode of the first photosensitive component when receiving the first control signal, and is configured to provide a second voltage to the first electrode of the first photosensitive component when receiving the second control signal.

4. The texture image acquisition circuit according to claim 3, wherein the first voltage is larger than the second voltage.

5. The texture image acquisition circuit according to claim 3, wherein
    the charge neutralization circuit comprises a first control transistor and a second control transistor,
    a gate electrode of the first control transistor is configured to receive the first control signal, a first electrode of the first control transistor is configured to receive the first voltage, and a second electrode of the first control transistor is connected to the first electrode of the first photosensitive component;
    a gate electrode of the second control transistor is configured to receive the second control signal, a first electrode of the second control transistor is connected to the first electrode of the first photosensitive component, and a second electrode of the second control transistor is configured to receive the second voltage;
    the first switch circuit comprises a first switch transistor, the first integral calculation circuit comprises a first calculation amplifier and a first capacitor,
    a gate electrode of the first switch transistor is configured to receive a first scanning signal, a first electrode of the first switch transistor is connected to the second electrode of the first photosensitive component, and a second electrode of the first switch transistor is connected to an inverting input terminal of the first calculation amplifier;
    a non-inverting input terminal of the first calculation amplifier is configured to receive a reference voltage, and an output terminal of the first calculation amplifier is configured to output the first acquisition value; and
    a first electrode of the first capacitor is connected to the inverting input terminal of the first calculation amplifier, and a second electrode of the first capacitor is connected to the output terminal of the first calculation amplifier.

6. The texture image acquisition circuit according to claim 2, wherein
    a first electrode of the first photosensitive component is configured to receive a second voltage, and the second electrode of the first photosensitive component is further electrically connected to the charge neutralization circuit; and
    the charge neutralization circuit is configured to provide a third voltage to the second electrode of the first photosensitive component when receiving the first control signal.

7. The texture image acquisition circuit according to claim 6, wherein
    the third voltage is less than the second voltage.

8. The texture image acquisition circuit according to claim 6, wherein
    the charge neutralization circuit comprises a third control transistor,
    a gate electrode of the third control transistor is configured to receive the first control signal, a first electrode of the third control transistor is configured to receive the third voltage, a second electrode of the third control transistor is connected to the second electrode of the first photosensitive component;
    the first switch circuit comprises a first switch transistor, the first integral calculation circuit comprises a first calculation amplifier and a first capacitor, a gate electrode of the first switch transistor is configured to receive a first scanning signal, a first electrode of the first switch transistor is connected to the second electrode of the first photosensitive component, and a second electrode of the first switch transistor is connected to an inverting input terminal of the first calculation amplifier;

a non-inverting input terminal of the first calculation amplifier is configured to receive a reference voltage, and an output terminal of the first calculation amplifier is configured to output the first acquisition value; and a first electrode of the first capacitor is connected to the inverting input terminal of the first calculation amplifier, and a second electrode of the first capacitor is connected to the output terminal of the first calculation amplifier.

9. The texture image acquisition circuit according to claim 2, wherein a first electrode of the first photosensitive component is configured to receive a second voltage, and the first integral calculation circuit is further electrically connected to the charge neutralization circuit, and the charge neutralization circuit is configured to provide a third voltage to the first integral calculation circuit when receiving the first control signal, and is configured to provide a reference voltage to the first integral calculation circuit when receiving the second control signal.

10. The texture image acquisition circuit according to claim 9, wherein the third voltage is less than the second voltage, and the reference voltage is larger than the second voltage.

11. The texture image acquisition circuit according to claim 9, wherein the charge neutralization circuit comprises a fourth control transistor and a fifth control transistor, the first switch circuit comprises a first switch transistor, the first integral calculation circuit comprises a first calculation amplifier and a first capacitor;

a gate electrode of the fourth control transistor is configured to receive the first control signal, a first electrode of the fourth control transistor is configured to receive the third voltage, and a second electrode of the fourth control transistor is connected to a non-inverting input terminal of the first calculation amplifier;

a gate electrode of the fifth control transistor is configured to receive the second control signal, a first electrode of the fifth control transistor is configured to receive the reference voltage, and a second electrode of the fifth control transistor is connected to the non-inverting input terminal of the first calculation amplifier;

a gate electrode of the first switch transistor is configured to receive a first scanning signal, a first electrode of the first switch transistor is connected to the second electrode of the first photosensitive component, and a second electrode of the first switch transistor is connected to an inverting input terminal of the first calculation amplifier;

an output terminal of the first calculation amplifier is configured to output the first acquisition value; and a first electrode of the first capacitor is connected to the inverting input terminal of the first calculation amplifier, and a second electrode of the first capacitor is connected to the output terminal of the first calculation amplifier.

12. The texture image acquisition circuit according to claim 2, further comprising a reference acquisition circuit, wherein the reference acquisition circuit is electrically connected to the charge neutralization circuit, is configured not to receive light from the texture and is configured to acquire a first reference value based on the first current.

13. The texture image acquisition circuit according to claim 12, wherein the reference acquisition circuit comprises a reference photosensitive component, a reference switch circuit and a reference integral calculation circuit;

a second electrode of the reference photosensitive component is connected to the reference switch circuit, and the reference switch circuit is further connected to the reference integral calculation circuit;

the reference photosensitive component is configured not to receive light from the texture, and is configured to acquire a reference signal amount based on the first current;

the reference integral calculation circuit is configured to receive the reference signal amount and perform integral calculation on the reference signal amount to acquire the first reference value.

14. The texture image acquisition circuit according to claim 13, wherein the reference photosensitive component and the first photosensitive component are of a same type of photosensitive component.

15. The texture image acquisition circuit according to claim 13, wherein the reference switch circuit comprises a reference switch transistor, the reference integral calculation circuit comprises a reference calculation amplifier and a reference capacitor, a gate electrode of the reference switch transistor is configured to receive a scanning signal, a first electrode of the reference switch transistor is connected to a second electrode of the reference photosensitive component, and a second electrode of the reference switch transistor is connected to an inverting input terminal of the reference calculation amplifier;

an output terminal of the reference calculation amplifier is configured to output the first reference value; and a first electrode of the reference capacitor is connected to the inverting input terminal of the reference calculation amplifier, and a second electrode of the reference capacitor is connected to the output terminal of the reference calculation amplifier.

16. The texture image acquisition circuit according to claim 1, further comprising a second acquisition circuit, wherein the charge neutralization circuit is electrically connected to the second acquisition circuit, the charge neutralization circuit is further configured to receive the first control signal to cause a current flowing through the second acquisition circuit to be the first current, and the charge neutralization circuit is further configured to receive the second control signal to cause the current flowing through the second acquisition circuit to be a third current, a direction of the third current and the direction of the first current are opposite to each other; and the second acquisition circuit is configured to receive the light from the texture and accumulate a second signal amount that is acquired through converting the light from the texture, so as to acquire a second acquisition value.

17. A display panel, comprising a display region, the display region comprising a texture recognition region, wherein a plurality of pixel units arranged in an array in the display region, and the pixel units in the texture recognition region each comprise the texture image acquisition circuit according to claim 1.

18. The display panel according to claim 17, further comprising a processing circuit, wherein the processing circuit is electrically connected to the first acquisition circuit, and is configured to process the first acquisition value, so as to acquire an image of the texture.

19. The display panel according to claim 18, wherein the texture image acquisition circuit further comprises a reference acquisition circuit, and the reference acquisition circuit is connected to the charge neutralization circuit and is configured not to receive the light from the texture and to acquire a first reference value based on the first current; and the processing circuit is further electrically connected to the reference acquisition circuit, and is configured to perform a processing operation according to the first acquisition value and the first reference value to acquire an image of the texture.

20. A texture image acquisition method for the texture image acquisition circuit according to claim 1, comprising:

during a charge neutralization period, allowing the charge neutralization circuit to receive the first control signal to cause the current flowing through the first acquisition circuit to be the first current;

during an acquisition period, allowing the charge neutralization circuit to receive the second control signal to cause the current flowing through the first acquisition circuit to be the second current, wherein the direction of the second current and the direction of the first current are opposite to each other; and allowing the first acquisition circuit to receive light from a texture and to accumulate a first signal amount that is acquired by converting the light from the texture, so as to acquire a first acquisition value.

* * * * *